(12) United States Patent
Lou et al.

(10) Patent No.: US 12,287,461 B2
(45) Date of Patent: Apr. 29, 2025

(54) OPTICAL IMAGING LENS ASSEMBLY

(71) Applicant: ZHEJIANG SUNNY OPTICS CO., LTD, Zhejiang (CN)

(72) Inventors: Qiqi Lou, Zhejiang (CN); Fujian Dai, Zhejiang (CN); Liefeng Zhao, Zhejiang (CN)

(73) Assignee: ZHEJIANG SUNNY OPTICS CO., LTD, Zhejiang (CN)

( * ) Notice: Subject to any disclaimer, the term of this patent is extended or adjusted under 35 U.S.C. 154(b) by 546 days.

(21) Appl. No.: 17/692,512

(22) Filed: Mar. 11, 2022

(65) Prior Publication Data

US 2022/0196990 A1 Jun. 23, 2022

Related U.S. Application Data

(63) Continuation of application No. PCT/CN2020/110043, filed on Aug. 19, 2020.

(30) Foreign Application Priority Data

Sep. 19, 2019 (CN) .......................... 201910884125.8

(51) Int. Cl.
*G02B 13/00* (2006.01)
*G02B 9/64* (2006.01)
*G02B 13/02* (2006.01)

(52) U.S. Cl.
CPC ........... *G02B 13/0045* (2013.01); *G02B 9/64* (2013.01); *G02B 13/02* (2013.01)

(58) Field of Classification Search
CPC ....... G02B 13/0045; G02B 9/64; G02B 13/02
See application file for complete search history.

(56) References Cited

U.S. PATENT DOCUMENTS 9,671,591 B2  6/2017  Hallum
10,663,693 B2  5/2020  Tang et al.
(Continued)

FOREIGN PATENT DOCUMENTS

CN  106154513 A  11/2016
CN  106950681 A  7/2017
(Continued)

OTHER PUBLICATIONS

English translation of International Search Report dated Oct. 27, 2020, issued in connection with PCT International Application No. PCT/CN2020/110043.
(Continued)

*Primary Examiner* — Sharrief I Broome
*Assistant Examiner* — K Muhammad
(74) *Attorney, Agent, or Firm* — Norris McLaughlin, P.A.

(57) ABSTRACT

An optical imaging lens assembly includes, sequentially from an object side to an image side along an optical axis, a first lens (E1) having a positive refractive power; a second lens (E2) having a refractive power; a third lens (E3) having a positive refractive power and an object-side surface (S5) of the third lens (E3) being convex; a fourth lens (E4) having a refractive power; a fifth lens (E5) having a refractive power and an image-side surface (S10) of the fifth lens (E5) being concave; a sixth lens (E6) having a refractive power; and a seventh lens (E7) having a refractive power. Half of a diagonal length ImgH of an effective pixel area on the imaging plane (S17) of the optical imaging lens assembly and an entrance pupil diameter EPD of the optical imaging lens assembly satisfy: ImgH/EPD<0.7.

17 Claims, 14 Drawing Sheets

(56) References Cited

U.S. PATENT DOCUMENTS

| | | | |
|---|---|---|---|
| 11,586,019 | B2 | 2/2023 | Lyu et al. |
| 2019/0227277 | A1 | 7/2019 | Tang et al. |
| 2019/0258028 | A1* | 8/2019 | Huang .................. H04N 23/55 |
| 2019/0271831 | A1* | 9/2019 | Hsu .................... G02B 13/0045 |
| 2019/0302423 | A1* | 10/2019 | Huang ............... G02B 13/0045 |
| 2021/0003826 | A1 | 1/2021 | Wenren et al. |
| 2021/0063699 | A1 | 3/2021 | Lyu et al. |

FOREIGN PATENT DOCUMENTS

| | | |
|---|---|---|
| CN | 108873256 A | 11/2018 |
| CN | 109358415 A | 2/2019 |
| CN | 109358416 A | 2/2019 |
| CN | 109491047 | 3/2019 |
| CN | 110082888 A | 8/2019 |
| CN | 110456489 A | 11/2019 |
| CN | 110488468 A | 11/2019 |
| CN | 211086755 U | 7/2020 |

OTHER PUBLICATIONS

International Search Report dated Oct. 27, 2020, issued in connection with PCT International Application No. PCT/CN2020/110043.
Written Opinion issued Nov. 25, 2020, in connection with PCT International Application No. PCT/CN2020/110043.

* cited by examiner

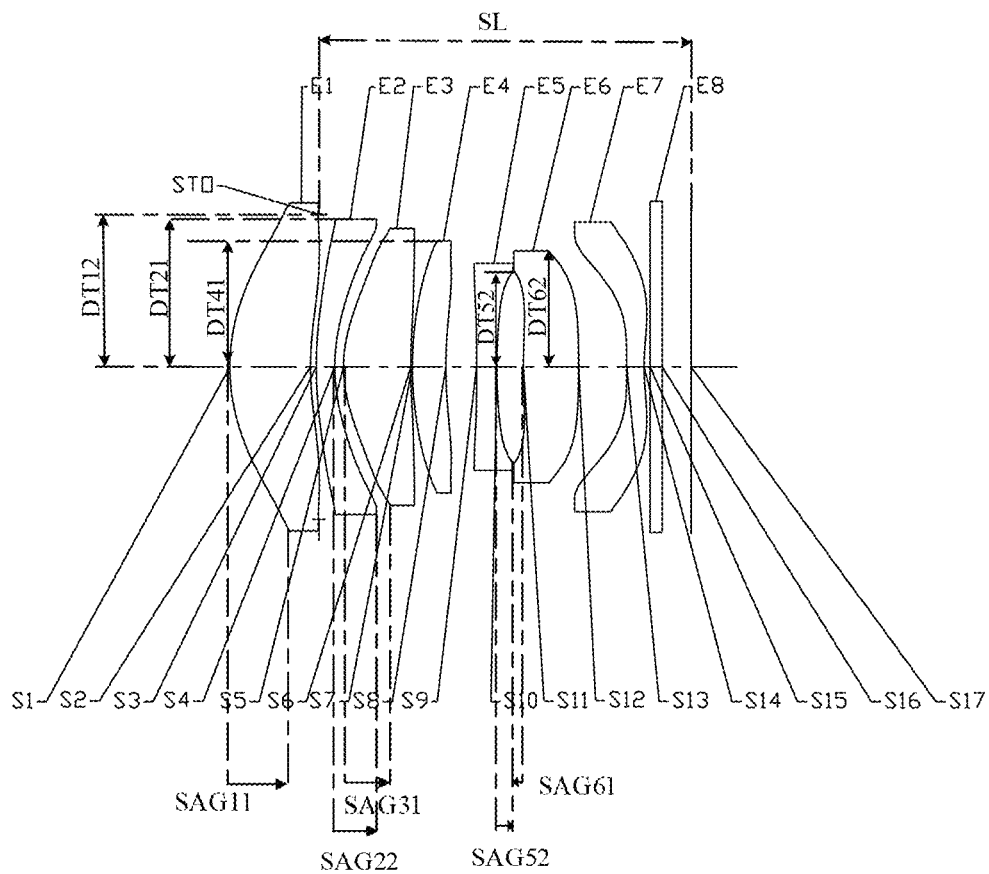
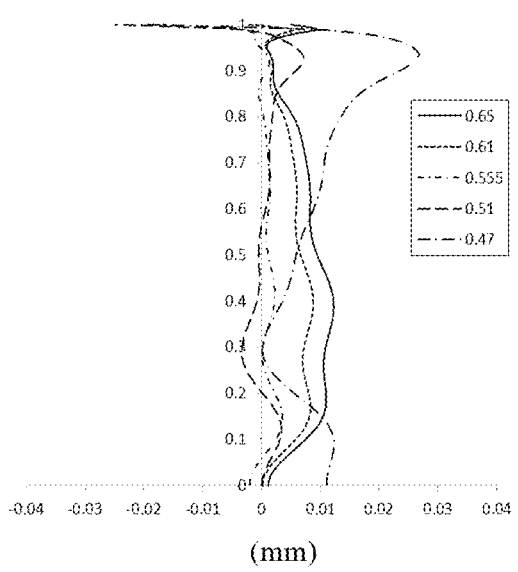
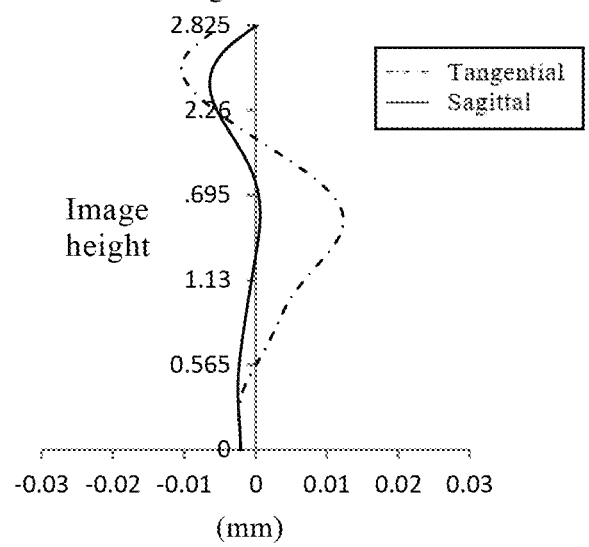
Fig. 1
Fig. 2A
Fig. 2B

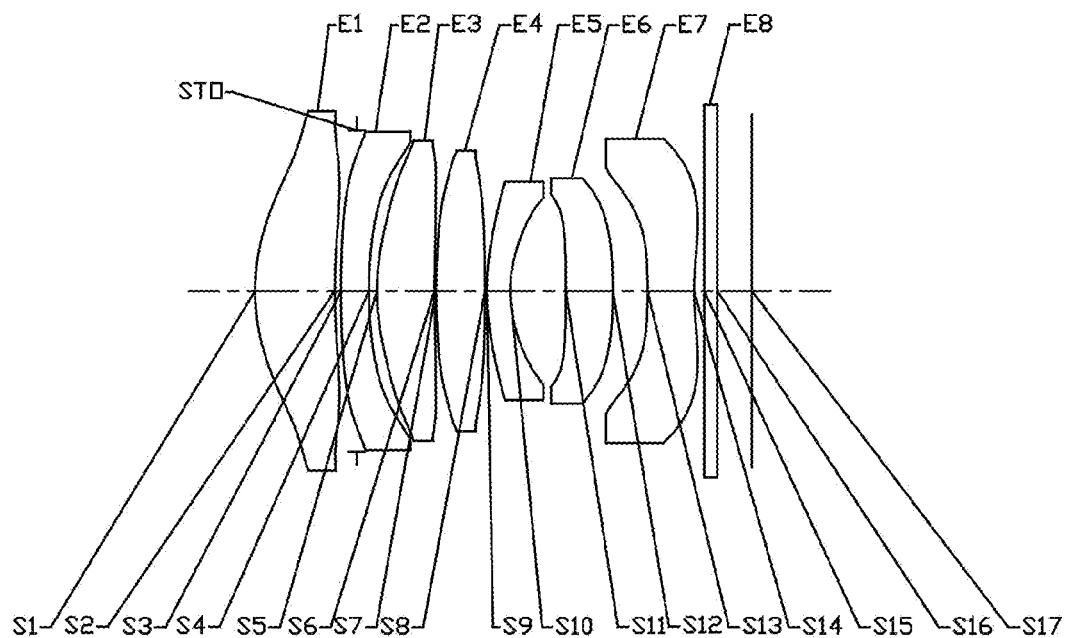
Fig. 5
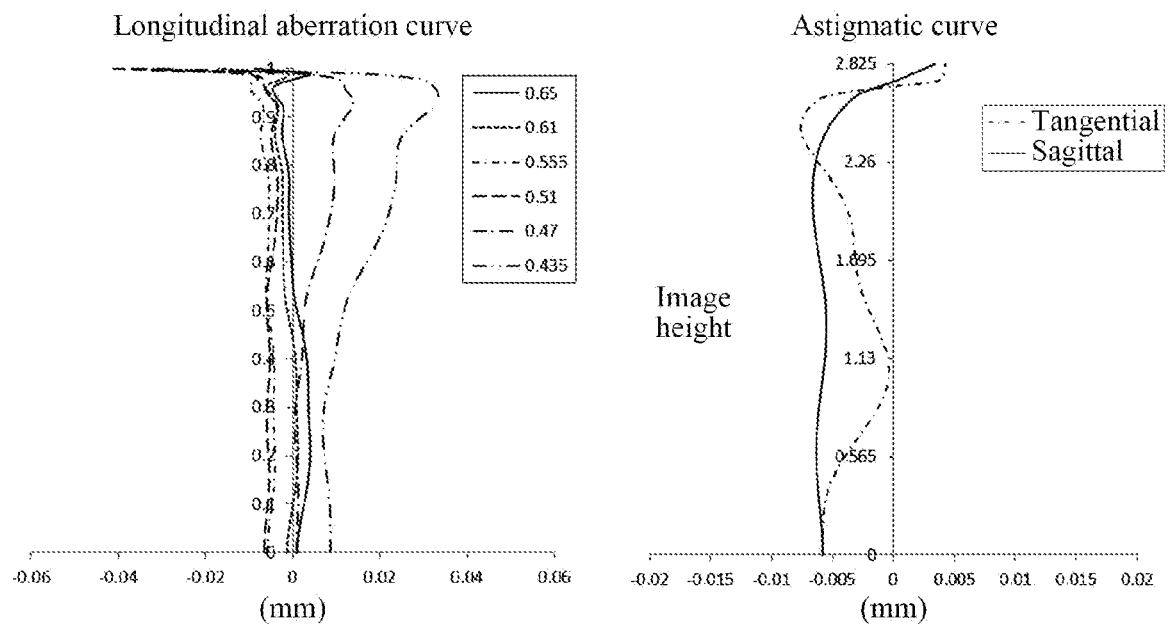
Fig. 6A
Fig. 6B

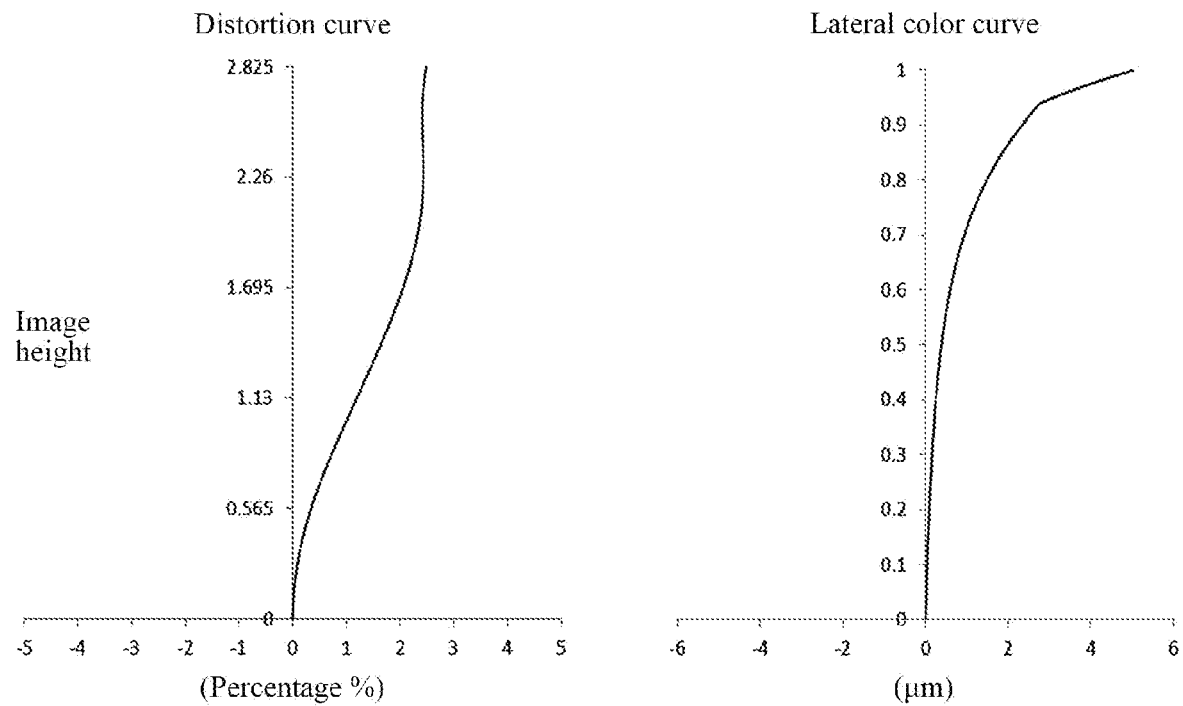
Fig. 10C
Fig. 10D
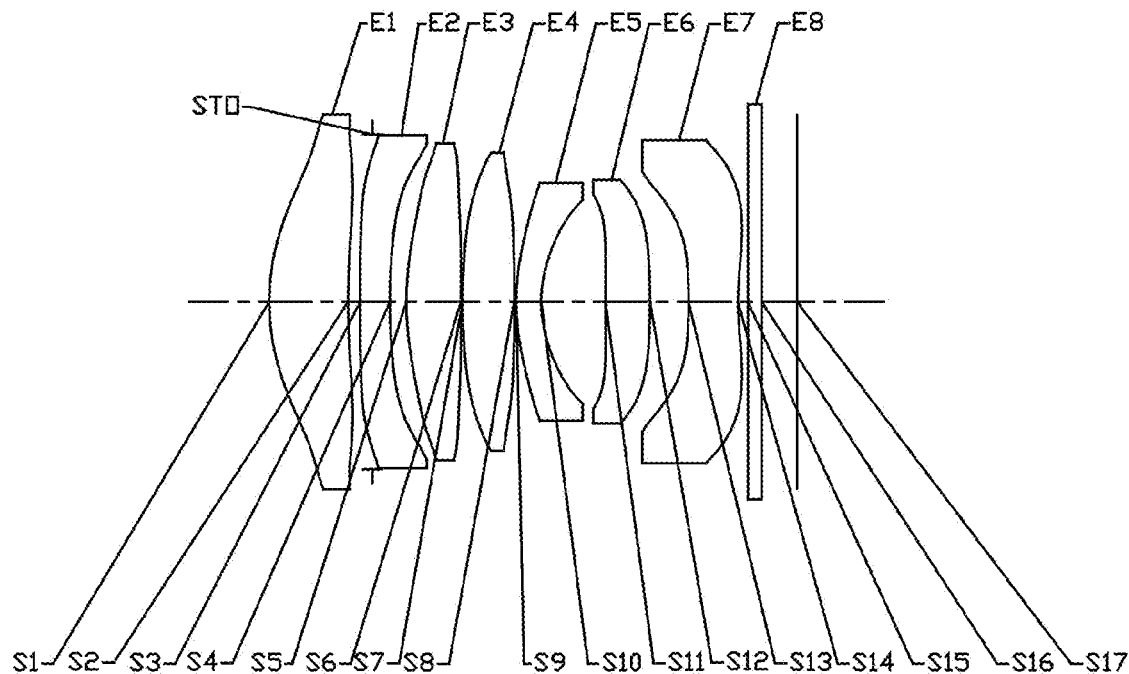
Fig. 11

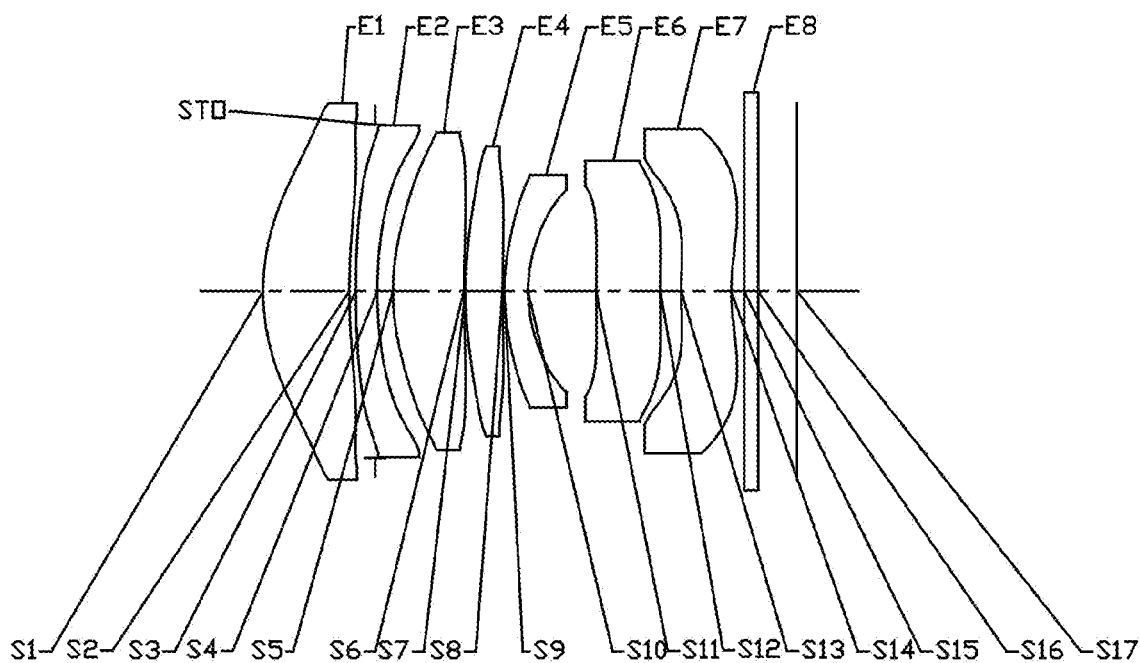
Fig. 17
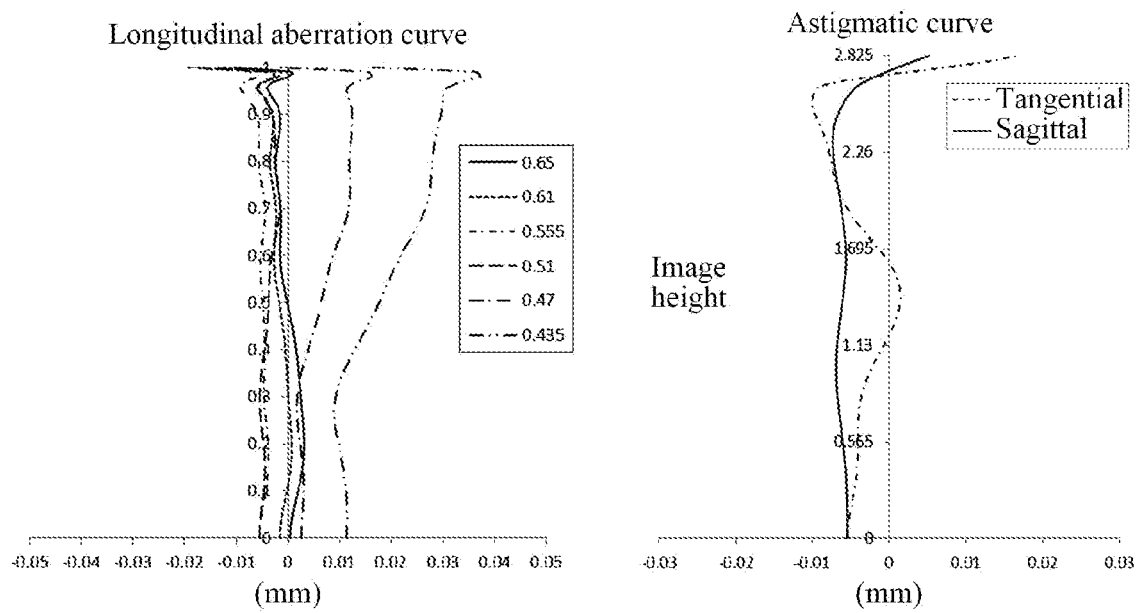
Fig. 18A
Fig. 18B

OPTICAL IMAGING LENS ASSEMBLY

CROSS-REFERENCE TO RELATED APPLICATION

This application is a continuation of International Application No. PCT/CN2020/110043, filed on Aug. 19, 2020, which claims priority to Chinese Patent Application No. 201910884125.8, filed before the China National Intellectual Property Administration (CNIPA) on Sep. 19, 2019. Both of the aforementioned applications are hereby incorporated by reference in their entireties.

TECHNICAL FIELD

The present disclosure relates to the field of optical elements, and specifically, relates to an optical imaging lens assembly.

BACKGROUND

In recent years, with the continuous development of camera devices, the camera devices gradually present the characteristics of ultra-thin and multi-environmental application. In particular, with continuous changes in the shooting environment, camera devices capable of performing high-definition imaging in a dimly lit environment have become an indispensable demand in the market. However, optical imaging lens assemblies are the key to determining the shooting effect of the camera devices. By increasing the apertures of the optical imaging lens assemblies, it is beneficial for the camera devices to obtain a good shooting effect in the dimly lit environment. In addition, by configuring the telephoto characteristic of the optical imaging lens assemblies, it is beneficial for the camera devices to perform high-definition imaging in a long distance.

SUMMARY

In one aspect, the present disclosure provides an optical imaging lens assembly which includes, sequentially from an object side to an image side along an optical axis, a first lens having a positive refractive power; a second lens having a refractive power; a third lens having a positive refractive power, and an object-side surface of the third lens being convex; a fourth lens having a refractive power; a fifth lens having a refractive power, and an image-side surface of the fifth lens being concave; a sixth lens having a refractive power; and a seventh lens having a refractive power.

In an embodiment, half of a diagonal length ImgH of an effective pixel area on an imaging plane of the optical imaging lens assembly and an entrance pupil diameter EPD of the optical imaging lens assembly satisfy: ImgH/EPD<0.7. Optionally, ImgH/EPD<0.6.

In an embodiment, a maximum effective radius DT12 of an image-side surface of the first lens and half of a diagonal length ImgH of an effective pixel area on an imaging plane of the optical imaging lens assembly satisfy: 0.8<DT12/ImgH<1.

In an embodiment, an effective focal length f3 of the third lens and a total effective focal length f of the optical imaging lens assembly satisfy: 0.5<f3/f<1.5.

In an embodiment, an axial distance SAG11 from an intersection of an object-side surface of the first lens and the optical axis to a vertex of an effective radius of the object-side surface of the first lens and a center thickness CT1 of the first lens along the optical axis satisfy: 0.5<SAG11/CT1<1.

In an embodiment, a combined focal length f1234 of the first lens, the second lens, the third lens and the fourth lens and a total effective focal length f of the optical imaging lens assembly satisfy: 0.5<f1234/f<1.

In an embodiment, a radius of curvature R1 of an object-side surface of the first lens and a radius of curvature R5 of the object-side surface of the third lens satisfy: 0.8<R1/R5<1.6.

In an embodiment, an axial distance SAG52 from an intersection of the image-side surface of the fifth lens and the optical axis to a vertex of an effective radius of the image-side surface of the fifth lens and an axial distance SAG61 from an intersection of an object-side surface of the sixth lens and the optical axis to a vertex of an effective radius of the object-side surface of the sixth lens satisfy: −4<SAG52/SAG61<0.

In an embodiment, a radius of curvature R10 of the image-side surface of the fifth lens and an effective focal length f5 of the fifth lens satisfy: −0.7<R10/f5<0.

In an embodiment, a spaced interval T12 between the first lens and the second lens along the optical axis, a spaced interval T23 between the second lens and the third lens along the optical axis, a spaced interval T34 between the third lens and the fourth lens along the optical axis, a spaced interval T56 between the fifth lens and the sixth lens along the optical axis and a spaced interval T67 between the sixth lens and the seventh lens along the optical axis satisfy: (T12+T23+T34)/(T56+T67)<0.4.

In an embodiment, a distance BFL along the optical axis from an image-side surface of the seventh lens to an imaging plane of the optical imaging lens assembly and an interval TD along the optical axis from an object-side surface of the first lens to the image-side surface of the seventh lens satisfy: BFL/TD<0.2.

In an embodiment, the optical imaging lens assembly further includes a stop disposed between the first lens and the second lens, and an interval SL along the optical axis from the stop to an imaging plane of the optical imaging lens assembly and a distance TTL along the optical axis from an object-side surface of the first lens to the imaging plane of the optical imaging lens assembly satisfy: 0.7<SL/TTL<0.9.

In an embodiment, the sequentially arranged first lens to the fifth lens are lenses arranged in a descending order of maximum effective radii.

In an embodiment, a maximum effective radius D41 of an object-side surface of the fourth lens and a maximum effective radius D52 of the image-side surface of the fifth lens satisfy: 1.2<DT41/DT52<1.6.

In an embodiment, an axial distance SAG22 from an intersection of an image-side surface of the second lens and the optical axis to a vertex of an effective radius of the image-side surface of the second lens and an axial distance SAG31 from an intersection of the object-side surface of the third lens and the optical axis to a vertex of an effective radius of the object-side surface of the third lens satisfy: 0.8<SAG22/SAG31<1.4.

In an embodiment, a maximum effective radius DT21 of an object-side surface of the second lens and a maximum effective radius DT62 of an image-side surface of the sixth lens satisfy: 1<DT21/DT62<1.5.

In an embodiment, a total effective focal length f of the optical imaging lens assembly and an entrance pupil diameter EPD of the optical imaging lens assembly satisfy: f/EPD<1.5.

In an embodiment, half of a maximum field-of-view Semi-FOV of the optical imaging lens assembly satisfies: tan(Semi-FOV)<0.55.

The optical imaging lens assembly provided by the present disclosure employs a plurality of lens arrangements, including a first lens to a seventh lens. By reasonably setting the proportional relationship between the maximum effective radius of the image-side surface of the first lens and half of the diagonal length of the effective pixel area on the imaging plane of the optical imaging lens assembly, and optimizing the configuration of the refractive powers and surface types of the lenses to make them reasonably match with each other, the aberration of the optical system is compensated and the image quality is improved, which is beneficial to make the lens assembly have the characteristics of large aperture and telephoto.

BRIEF DESCRIPTION OF THE DRAWINGS

Other features, objectives, and advantages of the present disclosure will become more apparent from the following detailed description of the non-limiting embodiments with reference to the accompanying drawings. In the drawings:

FIG. 1 illustrates a schematic structural diagram of an optical imaging lens assembly according to example 1 of the present disclosure;

FIGS. 2A to 2D illustrate longitudinal aberration curves, astigmatic curves, a distortion curve, and a lateral color curve of the optical imaging lens assembly of the example 1, respectively;

FIG. 5 illustrates a schematic structural diagram of an optical imaging lens assembly according to example 3 of the present disclosure;

FIGS. 6A to 6D illustrate longitudinal aberration curves, astigmatic curves, a distortion curve, and a lateral color curve of the optical imaging lens assembly of the example 3, respectively;

FIGS. 10A to 10D illustrate longitudinal aberration curves, astigmatic curves, a distortion curve, and a lateral color curve of the optical imaging lens assembly of the example 5, respectively;

FIG. 11 illustrates a schematic structural diagram of an optical imaging lens assembly according to example 6 of the present disclosure;

FIG. 17 illustrates a schematic structural diagram of an optical imaging lens assembly according to example 9 of the present disclosure; and FIGS. 18A to 18D illustrate longitudinal aberration curves, astigmatic curves, a distortion curve, and a lateral color curve of the optical imaging lens assembly of the example 9, respectively.

DETAILED DESCRIPTION OF EMBODIMENTS

Figure 2C:
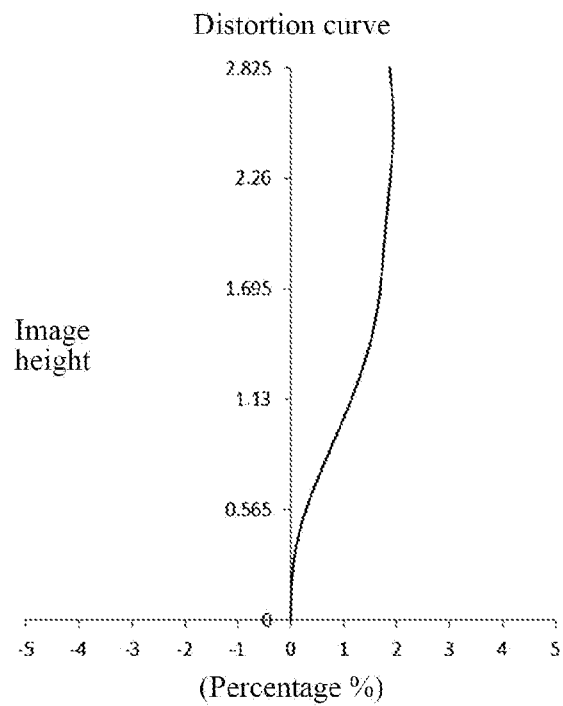

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex surface is not defined, it indicates that the surface of the lens is convex at least in the paraxial region; and if a surface of a lens is concave and the position of the concave surface is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include seven lenses having refractive powers, i.e., a first lens, a second lens, a third lens, a fourth lens, a fifth lens, a sixth lens and a seventh lens. The seven lenses are arranged sequentially from an object side to an image side along an optical axis.

In an exemplary embodiment, the first lens may have a positive refractive power, an object-side surface thereof is convex, and an image-side surface thereof is concave; the second lens may have a negative refractive power, and an image-side surface thereof is concave; the third lens may have a positive refractive power, and an object-side surface thereof is convex; the fourth lens may have a positive refractive power, and an object-side surface thereof is convex; the fifth lens may have a negative refractive power, an object-side surface thereof is convex, and an image-side surface thereof is concave; the sixth lens may have a positive or negative refractive power; and the seventh lens may have a negative refractive power, and an image-side surface thereof is concave. By properly configuring the refractive powers and surface type of each lens in the optical system, the aberration of the optical system may be effectively compensated, thereby improving the image quality.

In an exemplary embodiment, half of a diagonal length ImgH of an effective pixel area on an imaging plane of the optical imaging lens assembly and an entrance pupil diameter EPD of the optical imaging lens assembly may satisfy: ImgH/EPD<0.7, for example, 0.5<ImgH/EPD<0.6. By reasonably setting the proportional relationship between the half of the diagonal length of the effective pixel area on the imaging plane of the optical imaging lens assembly and the entrance pupil diameter of the optical imaging lens assembly, it is beneficial to achieve the characteristics of the optical imaging lens assembly, such as the large aperture and telephoto. In the case where a field-of-view is constant, the larger the diameter of the entrance pupil is, the larger the aperture will be.

In an exemplary embodiment, a maximum effective radius DT12 of the image-side surface of the first lens and half of a diagonal length ImgH of an effective pixel area on an imaging plane of the optical imaging lens assembly may satisfy: 0.8<DT12/ImgH<1, for example, 0.9<DT12/ImgH<1. By reasonably setting the proportional relationship between the maximum effective radius of the image-side surface of the first lens and the half of the diagonal length of the effective pixel area on the imaging plane of the optical imaging lens assembly, it is not only beneficial to control the aperture size of the optical imaging lens assembly to ensure that the lens assembly has the characteristics of large aperture, but also beneficial for the lens assembly to have the characteristics of telephoto.

In an exemplary embodiment, an effective focal length f3 of the third lens and a total effective focal length f of the optical imaging lens assembly may satisfy: 0.5<f3/f<1.5. By setting the ratio of the effective focal length of the third lens to the total effective focal length of the optical imaging lens assembly within a reasonable value range, it is not only beneficial to achieve the focusing characteristics of the front lens group, but also beneficial to effectively eliminate the axial aberration of the optical system through the reasonable configuration of the refractive power of the front lens group.

In an exemplary embodiment, an axial distance SAG11 from an intersection of the object-side surface of the first lens and the optical axis to a vertex of an effective radius of the object-side surface of the first lens and a center thickness CT1 of the first lens along the optical axis may satisfy: 0.5<SAG11/CT1<1, for example, 0.6<SAG11/CT1<0.8. By reasonably setting the proportional relationship between the sagittal height of the object-side surface of the first lens and the center thickness of the first lens along the optical axis, it is beneficial to better share the large aperture, and at the same time effectively reduce the spherical aberration and chromatic spherical aberration of the optical imaging lens assembly.

In an exemplary embodiment, a combined focal length f1234 of the first lens, the second lens, the third lens and the fourth lens, and a total effective focal length f of the optical imaging lens assembly may satisfy: 0.5<f1234/f<1, for example, 0.6<f1234/f<0.8. By setting the ratio of the combined focal length of the first lens, the second lens, the third lens and the fourth lens to the total effective focal length of the optical imaging lens assembly within a reasonable value range, it is beneficial to achieve the positive refractive power characteristic of the front lens group (i.e., the first lens to the fourth lens) and effectively share the large aperture. At the same time, it is beneficial to reduce the chromatic aberration of the system by reasonably configuring the refractive power of each lens.

In an exemplary embodiment, a radius of curvature R1 of the object-side surface of the first lens and a radius of curvature R5 of the object-side surface of the third lens may satisfy: 0.8<R1/R5<1.6. By reasonably setting the proportional relationship between the radius of curvature of the object-side surface of the first lens and the radius of curvature of the object-side surface of the third lens, it is beneficial to achieve the focusing characteristics of the front lens group.

In an exemplary embodiment, an axial distance SAG52 from an intersection of the image-side surface of the fifth lens and the optical axis to a vertex of an effective radius of the image-side surface of the fifth lens and an axial distance SAG61 from an intersection of an object-side surface of the sixth lens and the optical axis to a vertex of an effective radius of the object-side surface of the sixth lens may satisfy: −4<SAG52/SAG61<0, for example, −4<SAG52/SAG61<−1. By reasonably setting the proportional relationship between the sagittal height of the image-side surface of the fifth lens and the sagittal height of the object-side surface of the sixth lens, it is beneficial to reduce the astigmatic and field curvature of the optical system while ensuring the incident angle of the chief ray of the optical system.

In an exemplary embodiment, a radius of curvature R10 of the image-side surface of the fifth lens and an effective focal length f5 of the fifth lens may satisfy: $-0.7<R10/f5<0$, for example, $-0.7<R10/f5<-0.15$. By reasonably setting the proportional relationship between the radius of curvature of the image-side surface of the fifth lens to the effective focal length of the fifth lens, it is beneficial to achieve the connection between the front lens group and the rear lens group, and the telephoto characteristic of the optical system.

In an exemplary embodiment, a spaced interval T12 between the first lens and the second lens along the optical axis, a spaced interval T23 between the second lens and the third lens along the optical axis, a spaced interval T34 between the third lens and the fourth lens along the optical axis, a spaced interval T56 between the fifth lens and the sixth lens along the optical axis and a spaced interval T67 between the sixth lens and the seventh lens along the optical axis may satisfy: $(T12+T23+T34)/(T56+T67)<0.4$, for example, $0.1<(T12+T23+T34)/(T56+T67)<0.4$. Reasonably setting the spatial distribution of the lenses along the optical axis and effectively controlling the spaced intervals between the lenses, it is beneficial for the optical system to better undertake the changes of refractive powers and effectively reduce the axial chromatic aberration of the optical system.

In an exemplary embodiment, a distance BFL along the optical axis from the image-side surface of the seventh lens to an imaging plane of the optical imaging lens assembly and an interval TD along the optical axis from the object-side surface of the first lens to the image-side surface of the seventh lens may satisfy: $BFL/TD<0.2$, for example, $0.1<BFL/TD<0.2$. By reasonably setting the proportional relationship between the distance along the optical axis from the image-side surface of the seventh lens to the imaging plane of the optical imaging lens assembly and the interval along the optical axis from the object-side surface of the first lens to the image-side surface of the seventh lens, it is beneficial to achieve the telephoto characteristic of the optical system and ensure the incident angle of the chief ray.

In an exemplary embodiment, the optical imaging lens assembly further includes a stop disposed between the first lens and the second lens. An interval SL along the optical axis from the stop to an imaging plane of the optical imaging lens assembly and a distance TTL along the optical axis from the object-side surface of the first lens to the imaging plane of the optical imaging lens assembly may satisfy: $0.7<SL/TTL<0.9$. By reasonably setting the proportional relationship between the interval along the optical axis from the stop to the imaging plane of the optical imaging lens assembly and the distance along the optical axis from the object-side surface of the first lens to the imaging plane of the optical imaging lens assembly, it is beneficial to achieve the miniaturization of the lens assembly while having the characteristics of large aperture.

In an exemplary embodiment, the sequentially arranged first lens to the fifth lens are lenses arranged in a descending order of maximum effective radii. Such an arrangement is beneficial to achieve the focusing characteristic of the front lens group.

In an exemplary embodiment, a maximum effective radius D41 of the object-side surface of the fourth lens and a maximum effective radius D52 of the image-side surface of the fifth lens may satisfy: $1.2<DT41/DT52<1.6$. The maximum effective radius of the object-side surface of the fourth lens and the maximum effective radius of the image-side surface of the fifth lens satisfy the above proportional relationship, which is beneficial for the optical imaging lens assembly to better undertake the changes of the refractive powers and achieve the telephoto characteristic of the system.

In an exemplary embodiment, an axial distance SAG22 from an intersection of the image-side surface of the second lens and the optical axis to a vertex of an effective radius of the image-side surface of the second lens and an axial distance SAG31 from an intersection of the object-side surface of the third lens and the optical axis to a vertex of an effective radius of the object-side surface of the third lens satisfy: $0.8<SAG22/SAG31<1.4$. By reasonably setting the proportional relationship between the sagittal height of the image-side surface of the second lens and the sagittal height of the object-side surface of the third lens, it is beneficial to achieve the focusing characteristic of the optical system and at the same time reduce the spherical aberration and chromatic spherical aberration of the optical system.

In an exemplary embodiment, a maximum effective radius DT21 of an object-side surface of the second lens and a maximum effective radius DT62 of an image-side surface of the sixth lens may satisfy: $1<DT21/DT62<1.5$, for example, $1.2<DT21/DT62<1.5$. By reasonably setting the proportional relationship between the maximum effective radius of the object-side surface of the second lens and the maximum effective radius of the image-side surface of the sixth lens, it is beneficial to reduce the off-axis aberration of the optical system and achieve the matching of the incident angle of the chief ray in the fringe field-of-view.

In an exemplary embodiment, a total effective focal length f of the optical imaging lens assembly and an entrance pupil diameter EPD of the optical imaging lens assembly may satisfy: $f/EPD<1.5$, for example, $f/EPD<1.3$. Satisfying $f/EPD<1.3$ may achieve an imaging system with a large aperture.

In an exemplary embodiment, half of a maximum field-of-view Semi-FOV of the optical imaging lens assembly may satisfy: $\tan(Semi\text{-}FOV)<0.55$, for example, $\tan(Semi\text{-}FOV)<0.50$. Satisfying $\tan(Semi\text{-}FOV)<0.55$ and $f/EPD<1.3$ at the same time is beneficial to achieving the telephoto characteristic of the system while ensuring the large aperture characteristic of the system.

Optionally, the optical imaging lens assembly according to the present disclosure may further include an optical filter for correcting the color deviation and/or a protective glass for protecting the photosensitive element located on an imaging plane.

The optical imaging lens assembly according to the present disclosure employs seven aspheric lenses. By matching and designing different lenses, higher image quality may be obtained. At the same time, the optical imaging lens assembly according to the present disclosure may have the characteristics of a large aperture while taking into account the long focus and ultra-thinness, and may effectively highlight the photographed object, thereby better satisfying the special function of portrait shooting.

In an exemplary embodiment, at least one of the surfaces of lenses is aspheric, that is, at least one of the object-side surface of the first lens to the image-side surface of the seventh lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With an aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens, the sixth lens and the seventh lens is aspheric. Optionally, the object-side surface and the image-side surface of each of the first lens, the second lens, the third lens, the fourth lens, the fifth lens, the sixth lens and the seventh lens are aspheric.

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

Exemplary embodiments of the present disclosure also provide an electronic apparatus including the above-described imaging apparatus.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking seven lenses as an example, the optical imaging lens assembly is not limited to including seven lenses. The optical imaging lens assembly may alternatively include other numbers of lenses if desired.

As shown in FIG. 1, the optical imaging lens assembly includes a first lens E1, a stop STO, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has a positive refractive power, an object-side surface S1 thereof is convex, and an image-side surface S2 thereof is concave. The second lens E2 has a negative refractive power, an object-side surface S3 thereof is convex, and an image-side surface S4 thereof is concave. The third lens E3 has a positive refractive power, an object-side surface S5 thereof is convex, and an image-side surface S6 thereof is concave. The fourth lens E4 has a positive refractive power, an object-side surface S7 thereof is convex, and an image-side surface S8 thereof is concave. The fifth lens E5 has a negative refractive power, an object-side surface S9 thereof is convex, and an image-side surface S10 thereof is concave. The sixth lens E6 has a positive refractive power, an object-side surface S11 thereof is convex, and an image-side surface S12 thereof is convex. The seventh lens E7 has a negative refractive power, an object-side surface S13 thereof is concave, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

Table 1 is a table illustrating basic parameters of the optical imaging lens assembly of example 1, wherein the units of the radius of curvature, the thickness/distance and the focal length are millimeter (mm).

TABLE 1

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| S1 | Aspheric | 3.2217 | 1.4000 | 1.55 | 56.1 | 11.63 | −0.4540 |
| S2 | Aspheric | 5.5364 | 0.1496 | | | | −41.5989 |
| STO | Spherical | Infinite | −0.0496 | | | | |
| S3 | Aspheric | 7.3276 | 0.3200 | 1.64 | 23.5 | −7.97 | −96.5865 |
| S4 | Aspheric | 2.9685 | 0.1509 | | | | −9.8142 |
| S5 | Aspheric | 2.1437 | 1.1692 | 1.55 | 56.1 | 4.56 | −5.2193 |
| S6 | Aspheric | 12.5406 | 0.0250 | | | | 26.8260 |
| S7 | Aspheric | 6.2918 | 0.5820 | 1.55 | 56.1 | 58.43 | 3.9743 |
| S8 | Aspheric | 7.5818 | 0.5315 | | | | −66.5019 |
| S9 | Aspheric | 102.6062 | 0.3500 | 1.67 | 20.4 | −11.17 | −99.0000 |
| S10 | Aspheric | 6.9322 | 0.4627 | | | | 14.3700 |
| S11 | Aspheric | 9.9717 | 0.9583 | 1.64 | 23.5 | 10.57 | −92.1637 |
| S12 | Aspheric | −20.6940 | 0.8339 | | | | −71.6275 |
| S13 | Aspheric | −57.9171 | 0.3000 | 1.55 | 56.1 | −5.75 | −99.0000 |
| S14 | Aspheric | 3.3267 | 0.1057 | | | | −29.1248 |
| S15 | Spherical | Infinite | 0.2100 | 1.52 | 64.2 | | |
| S16 | Spherical | Infinite | 0.5009 | | | | |
| S17 | Spherical | Infinite | | | | | |

Some specific examples of an optical imaging lens assembly applicable to the above embodiment will be further described below with reference to the accompanying drawings.

Example 1

An optical imaging lens assembly according to example 1 of the present disclosure is described below with reference to FIG. 1 to FIG. 2D. FIG. 1 is a schematic structural diagram of the optical imaging lens assembly according to example 1 of the present disclosure.

In this example, a total effective focal length f of the optical imaging lens assembly satisfies f=6.60 mm, a distance TTL along the optical axis from the object-side surface S1 of the first lens E1 to the imaging plane S17 satisfies TTL=8.00 mm, half of a diagonal length ImgH of an effective pixel area on the imaging plane S17 satisfies ImgH=2.83 mm, and half of a maximum field-of-view Semi-FOV of the optical imaging lens assembly satisfies Semi-FOV=22.8°.

In example 1, the object-side surface and the image-side surface of any one of the first lens E1 to the seventh lens E7 are aspheric. The surface type x of each aspheric lens may be defined by using, but not limited to, the following aspheric formula:

$$x = \frac{ch^2}{1 + \sqrt{1-(k+1)c^2h^2}} + \Sigma A_i h^i \quad (1)$$

Here, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient of the i-th order of the aspheric surface. Table 2 below shows high-order coefficients A4, A6, A8, A10, A12, A14, A16, A18 and A20 applicable to each aspheric surface S1 to S14 in example 1.

Figure 2D:
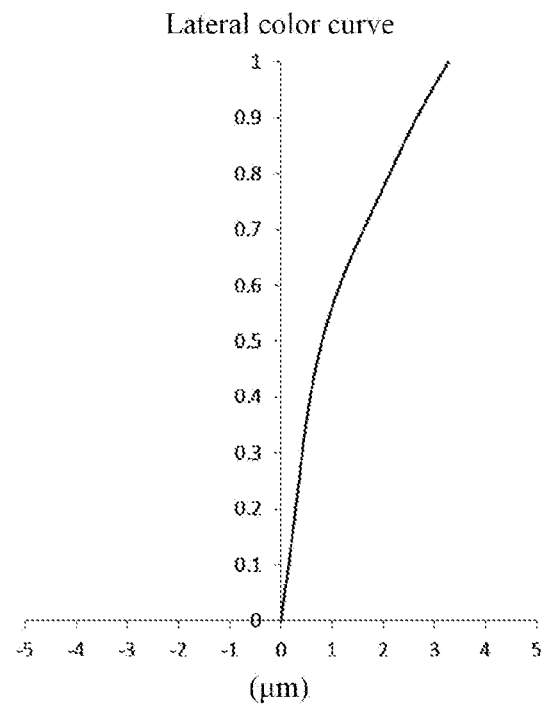

FIG. 2A illustrates longitudinal aberration curves of the optical imaging lens assembly according to example 1, representing the deviations of focal points converged by light of different wavelengths which passes through the lens assembly. FIG. 2B illustrates astigmatic curves of the optical imaging lens assembly according to example 1, representing the curvatures of a tangential plane and the curvatures of a sagittal plane. FIG. 2C illustrates a distortion curve of the optical imaging lens assembly according to example 1, representing the amounts of distortion corresponding to different image heights. FIG. 2D illustrates a lateral color curve of the optical imaging lens assembly according to example 1, representing the deviations of different image heights on an imaging plane formed by light passing through the lens assembly. It can be seen from FIG. 2A to FIG. 2D that the optical imaging lens assembly provided in example 1 may achieve good image quality.

Example 2

Figure 3:
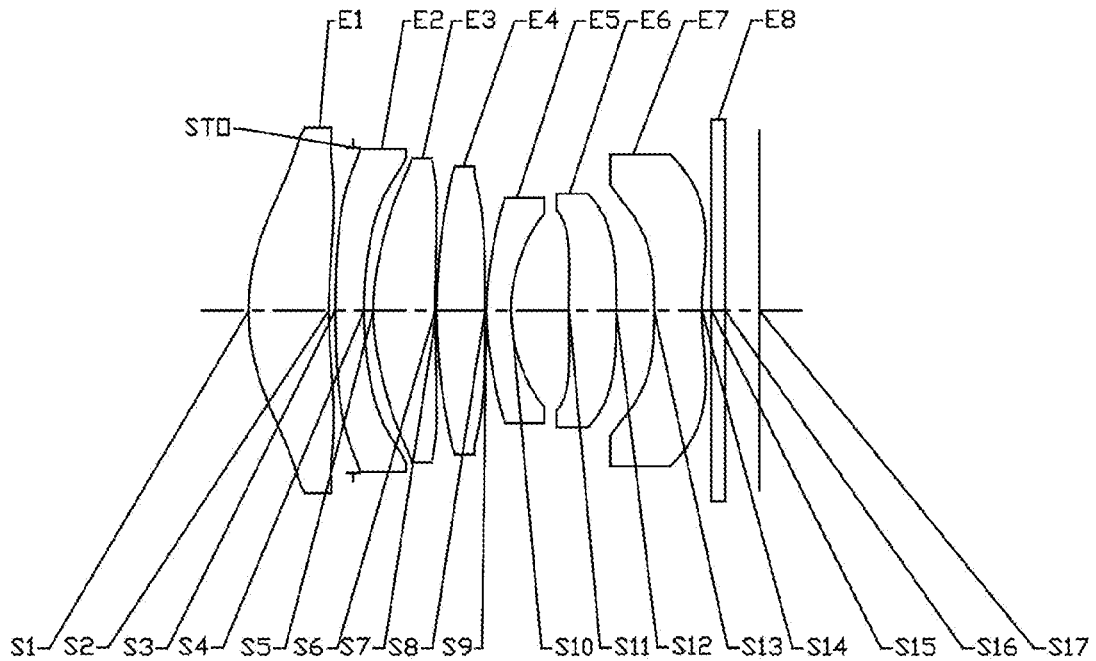
FIG. 3 illustrates a schematic structural diagram of an optical imaging lens assembly according to example 2 of the present disclosure.

An optical imaging lens assembly according to example 2 of the present disclosure is described below with reference to FIG. 3 to FIG. 4D. FIG. 3 shows a schematic structural diagram of the optical imaging lens assembly according to example 2 of the present disclosure.

As shown in FIG. 3, the optical imaging lens assembly includes a first lens E1, a stop STO, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has a positive refractive power, an object-side surface S1 thereof is convex, and an image-side surface S2 thereof is concave. The second lens E2 has a negative refractive power, an object-side surface S3 thereof is convex, and an image-side surface S4 thereof is concave. The third lens E3 has a positive refractive power, an object-side surface S5 thereof is convex, and an image-side surface S6 thereof is concave. The fourth lens E4 has a positive refractive power, an object-side surface S7 thereof is convex, and an image-side surface S8 thereof is convex. The fifth lens E5 has a negative refractive power, an object-side surface S9 thereof is convex, and an image-side surface S10 thereof is concave. The sixth lens E6 has a positive refractive power, an object-side surface S11 thereof is convex, and an image-side surface S12 thereof is convex. The seventh lens E7 has a negative refractive power, an object-side surface S13 thereof is concave, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=6.60 mm, a distance TTL along the optical axis from the object-side surface S1 of the first lens E1 to the imaging plane S17 satisfies TTL=8.00 mm, half of a diagonal length ImgH of an effective pixel area on the imaging plane S17 satisfies ImgH=2.83 mm, and half of a maximum field-of-view Semi-FOV of the optical imaging lens assembly satisfies Semi-FOV=22.6°.

Table 3 is a table illustrating basic parameters of the optical imaging lens assembly of example 2, wherein the units of the radius of curvature, the thickness/distance and the focal length are millimeter (mm).

TABLE 2

| Surface number | A4 | A6 | A8 | A10 | A12 | A14 | A16 | A18 | A20 |
|---|---|---|---|---|---|---|---|---|---|
| S1 | −1.0652E−03 | −5.3472E−04 | 1.5233E−04 | −5.6814E−05 | 7.8920E−06 | −2.5765E−07 | −1.3599E−07 | 2.4147E−08 | −1.1629E−09 |
| S2 | 3.4831E−02 | −4.1889E−02 | 2.3232E−02 | −8.3603E−03 | 2.0389E−03 | −3.3275E−04 | 3.4655E−05 | −2.0731E−06 | 5.4066E−08 |
| S3 | 4.7702E−02 | −4.8001E−02 | 2.8357E−02 | −1.0926E−02 | 2.8241E−03 | −4.8089E−04 | 5.1397E−05 | −3.1099E−06 | 8.0527E−08 |
| S4 | 1.7544E−02 | −2.6360E−03 | −3.5358E−03 | 3.8711E−03 | −1.9959E−03 | 5.9155E−04 | −9.9766E−05 | 8.8188E−06 | −3.1727E−07 |
| S5 | 8.7149E−03 | 4.9193E−03 | −1.1776E−02 | 8.4465E−03 | −3.7531E−03 | 1.0745E−03 | −1.8502E−04 | 1.7260E−05 | −6.7108E−07 |
| S6 | 2.9408E−02 | −7.6562E−02 | 6.6895E−02 | −3.4616E−02 | 1.1546E−02 | −2.4867E−03 | 3.2977E−04 | −2.4085E−05 | 7.2282E−07 |
| S7 | 4.2832E−02 | −7.8643E−02 | 6.2877E−02 | −2.7680E−02 | 6.7377E−03 | −6.1620E−04 | −1.0416E−04 | 3.1834E−05 | −2.3220E−06 |
| S8 | 2.2017E−02 | −1.9564E−02 | 2.0393E−03 | 5.0577E−03 | −4.5037E−03 | 2.0278E−03 | −5.2952E−04 | 7.5516E−05 | −4.5222E−06 |
| S9 | −2.6583E−02 | 6.7376E−03 | −6.6304E−04 | 1.4116E−03 | 1.1168E−04 | −7.3354E−04 | 3.4391E−04 | −6.6150E−05 | 4.7193E−06 |
| S10 | −3.4023E−02 | 1.5230E−02 | −5.1362E−03 | 9.3800E−03 | −8.4860E−03 | 4.8930E−03 | −1.8174E−03 | 3.8038E−04 | −3.4625E−05 |
| S11 | −2.0637E−02 | −4.1037E−03 | −8.7410E−03 | 1.7423E−02 | −1.8065E−02 | 1.1397E−02 | −4.3574E−03 | 9.1985E−04 | −8.2868E−05 |
| S12 | −1.9499E−02 | −5.9024E−03 | 5.2676E−03 | −7.2675E−03 | 5.8700E−03 | −2.7671E−03 | 7.6817E−04 | −1.1736E−04 | 7.6715E−06 |
| S13 | −1.5982E−01 | 7.7301E−02 | −2.9713E−02 | 2.5968E−03 | 3.9226E−03 | −2.0406E−03 | 4.5955E−04 | −5.0895E−05 | 2.2482E−06 |
| S14 | −8.0454E−02 | 2.8642E−02 | −7.1172E−03 | −9.2039E−04 | 1.4353E−03 | −4.9194E−04 | 8.4269E−05 | −7.4630E−06 | 2.7418E−07 |

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 3.3983 | 1.2592 | 1.55 | 56.1 | 8.53 | −0.6692 |
| S2 | Aspheric | 10.9396 | 0.3779 | | | | −99.0000 |
| STO | Spherical | Infinite | −0.2779 | | | | |
| S3 | Aspheric | 25.4452 | 0.4500 | 1.67 | 20.4 | −15.53 | 83.1487 |
| S4 | Aspheric | 7.3036 | 0.1453 | | | | −1.6335 |
| S5 | Aspheric | 3.7361 | 0.9673 | 1.55 | 56.1 | 8.47 | −5.7701 |
| S6 | Aspheric | 17.6681 | 0.0250 | | | | 52.1616 |
| S7 | Aspheric | 9.0865 | 0.7555 | 1.55 | 56.1 | 14.68 | 2.5765 |
| S8 | Aspheric | −65.8367 | 0.0250 | | | | −99.0000 |
| S9 | Aspheric | 3.8387 | 0.3800 | 1.67 | 20.4 | −8.05 | −4.8207 |
| S10 | Aspheric | 2.1493 | 0.9111 | | | | 0.5250 |
| S11 | Aspheric | 23.1364 | 0.7432 | 1.67 | 20.4 | 14.52 | 99.0000 |
| S12 | Aspheric | −16.4255 | 0.5903 | | | | 74.6117 |
| S13 | Aspheric | −16.2052 | 0.7500 | 1.55 | 56.1 | −6.38 | 58.7695 |
| S14 | Aspheric | 4.5116 | 0.1496 | | | | −25.2030 |
| S15 | Spherical | Infinite | 0.2100 | 1.52 | 64.2 | | |
| S16 | Spherical | Infinite | 0.5385 | | | | |
| S17 | Spherical | Infinite | | | | | |

In example 2, the object-side surface and the image-side surface of any one of the first lens E1 to the seventh lens E7 are aspheric. Table 4 below shows high-order coefficients A4, A6, A8, A10, A12, A14, A16, A18 and A20 applicable to each aspheric surface S1 to S14 in example 2.

TABLE 4

| Surface number | A4 | A6 | A8 | A10 | A12 | A14 | A16 | A18 | A20 |
|---|---|---|---|---|---|---|---|---|---|
| S1 | −8.9307E−04 | −5.2644E−04 | −1.9419E−05 | 1.6399E−05 | −1.4046E−05 | 2.1432E−06 | 4.4444E−08 | −2.6002E−08 | 1.3079E−09 |
| S2 | 2.0341E−02 | −2.5562E−02 | 1.4657E−02 | −5.5207E−03 | 1.3887E−03 | −2.2963E−04 | 2.3966E−05 | −1.4313E−06 | 3.7362E−08 |
| S3 | 2.9771E−02 | −2.9489E−02 | 1.7548E−02 | −6.4223E−03 | 1.5492E−03 | −2.4532E−04 | 2.4404E−05 | −1.3859E−06 | 3.4264E−08 |
| S4 | 2.3921E−02 | −2.1099E−02 | 1.0058E−02 | −1.7352E−03 | −2.1947E−04 | 1.7804E−04 | −4.0166E−05 | 4.3196E−06 | −1.8605E−07 |
| S5 | 1.1435E−02 | −9.8023E−03 | −4.0773E−04 | 3.2335E−03 | −1.5516E−03 | 3.7875E−04 | −5.5077E−05 | 4.5735E−06 | −1.6703E−07 |
| S6 | 6.6599E−03 | −4.3421E−02 | 3.8749E−02 | −1.6541E−02 | 3.8425E−03 | −4.8464E−04 | 2.7188E−05 | 1.3897E−07 | −5.7715E−08 |
| S7 | 2.0774E−02 | −5.2223E−02 | 4.5969E−02 | −1.9860E−02 | 4.5573E−03 | −5.3697E−04 | 2.5785E−05 | 0.0000E+00 | 0.0000E+00 |
| S8 | 5.1815E−03 | −1.3255E−02 | 7.6505E−03 | −2.9453E−03 | 7.3356E−04 | −1.0245E−04 | 6.0294E−06 | 0.0000E+00 | 0.0000E+00 |
| S9 | −3.1763E−02 | 1.9370E−02 | −8.2258E−03 | 2.5755E−03 | −3.7516E−04 | −7.3391E−06 | 5.3552E−06 | 0.0000E+00 | 0.0000E+00 |
| S10 | −6.1253E−02 | 2.9349E−02 | −1.3471E−02 | 2.7471E−03 | 5.6574E−04 | −4.6702E−04 | 6.5178E−05 | 0.0000E+00 | 0.0000E+00 |
| S11 | −2.5196E−02 | 6.1268E−04 | −4.3310E−03 | 1.8384E−03 | −5.9797E−04 | 3.3565E−05 | 0.0000E+00 | 0.0000E+00 | 0.0000E+00 |
| S12 | −2.5944E−02 | 9.6467E−03 | −1.3259E−02 | 1.1789E−02 | −7.0981E−03 | 2.5712E−03 | −5.1004E−04 | 4.3329E−05 | 0.0000E+00 |
| S13 | −8.1521E−02 | 2.3889E−02 | −8.9121E−03 | 4.4364E−03 | −1.8044E−03 | 3.9525E−04 | −3.1655E−05 | 0.0000E+00 | 0.0000E+00 |
| S14 | −3.9126E−02 | 6.1123E−03 | −4.5942E−04 | −2.3088E−04 | 7.2717E−05 | −8.8810E−06 | 4.3216E−07 | 0.0000E+00 | 0.0000E+00 |

Figure 4A:
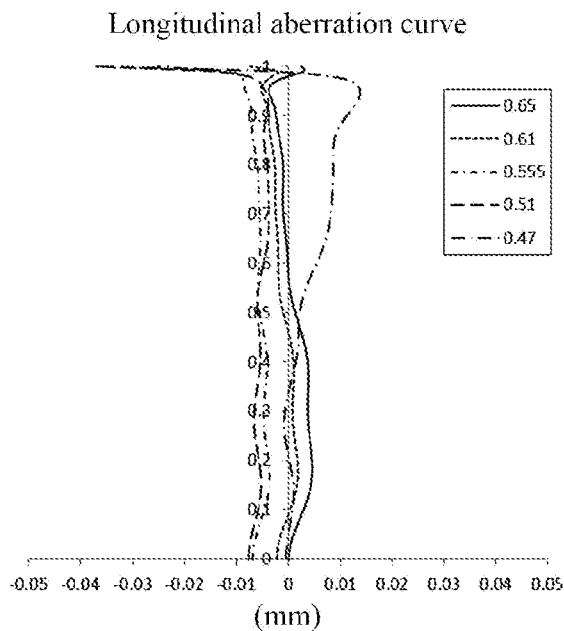
FIGS. 4A to 4D illustrate longitudinal aberration curves, astigmatic curves, a distortion curve, and a lateral color curve of the optical imaging lens assembly of the example 2, respectively.
Figure 4B:
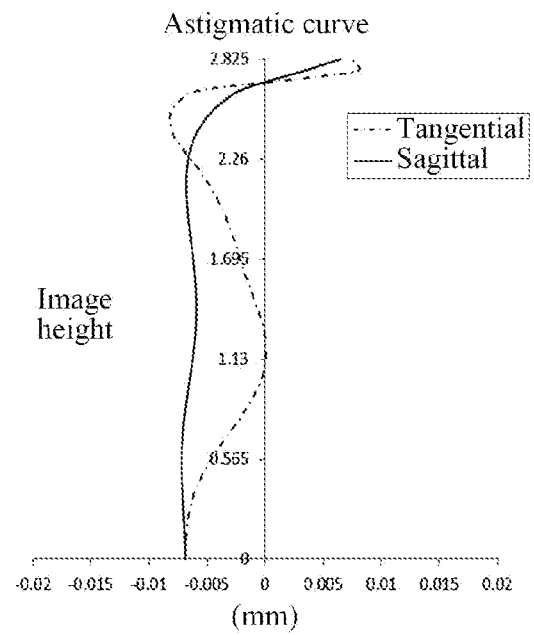
Figure 4C:
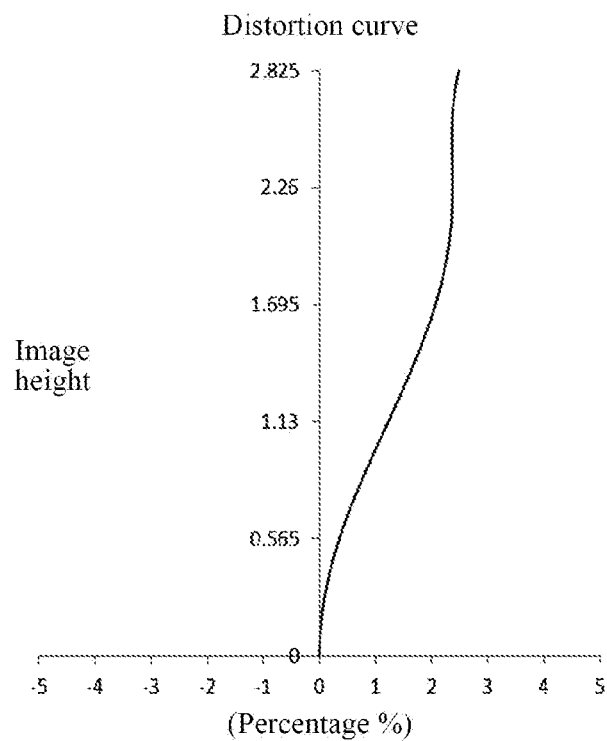
Figure 4D:
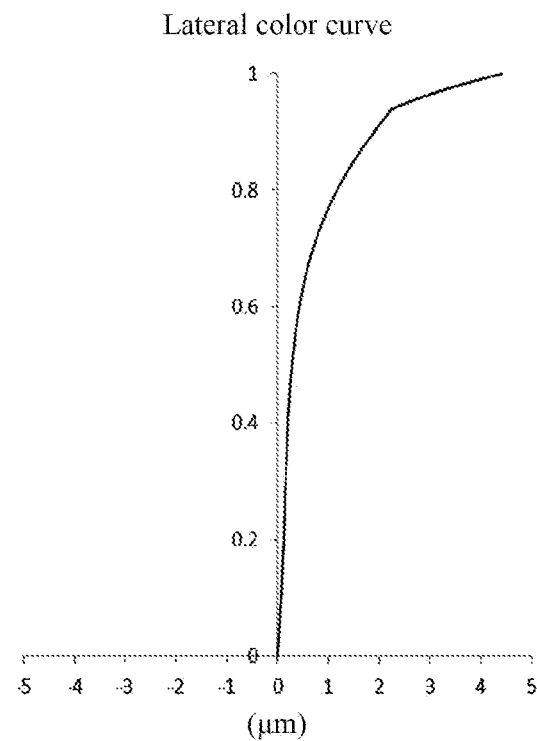

FIG. 4A illustrates longitudinal aberration curves of the optical imaging lens assembly according to example 2, representing the deviations of focal points converged by light of different wavelengths which passes through the lens assembly. FIG. 4B illustrates astigmatic curves of the optical imaging lens assembly according to example 2, representing the curvatures of a tangential plane and the curvatures of a sagittal plane. FIG. 4C illustrates a distortion curve of the optical imaging lens assembly according to example 2, representing the amounts of distortion corresponding to different image heights. FIG. 4D illustrates a lateral color curve of the optical imaging lens assembly according to example 2, representing the deviations of different image heights on an imaging plane formed by light passing through the lens assembly. It can be seen from FIG. 4A to FIG. 4D that the optical imaging lens assembly provided in example 2 may achieve good image quality.

Example 3

An optical imaging lens assembly according to example 3 of the present disclosure is described below with reference to FIG. 5 to FIG. 6D. FIG. 5 shows a schematic structural diagram of the optical imaging lens assembly according to example 3 of the present disclosure.

As shown in FIG. 5, the optical imaging lens assembly includes a first lens E1, a stop STO, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has a positive refractive power, an object-side surface S1 thereof is convex, and an image-side surface S2 thereof is concave. The second lens E2 has a negative refractive power, an object-side surface S3 thereof is convex, and an image-side surface S4 thereof is concave. The third lens E3 has a positive refractive power, an object-side surface S5 thereof is convex, and an image-side surface S6 thereof is concave. The fourth lens E4 has a positive refractive power, an object-side surface S7 thereof is convex, and an image-side surface S8 thereof is convex. The fifth lens E5 has a negative refractive power, an object-side surface S9 thereof is convex, and an image-side surface S10 thereof is concave. The sixth lens E6 has a positive refractive power, an object-side surface S11 thereof is concave, and an image-side surface S12 thereof is convex. The seventh lens E7 has a negative refractive power, an object-side surface S13 thereof is concave, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=6.62 mm, a distance TTL along the optical axis from the object-side surface S1 of the first lens E1 to the imaging plane S17 satisfies TTL=8.00 mm, half of a diagonal length ImgH of an effective pixel area on the imaging plane S17 satisfies ImgH=2.83 mm, and half of a maximum field-of-view Semi-FOV of the optical imaging lens assembly satisfies Semi-FOV=22.6°.

Table 5 is a table illustrating basic parameters of the optical imaging lens assembly of example 3, wherein the units of the radius of curvature, the thickness/distance and the focal length are millimeter (mm).

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 3.3360 | 1.2845 | 1.55 | 56.1 | 8.48 | −0.7250 |
| S2 | Aspheric | 10.3067 | 0.3581 | | | | −99.0000 |
| STO | Spherical | Infinite | −0.2581 | | | | |
| S3 | Aspheric | 25.4220 | 0.4500 | 1.67 | 20.4 | −15.40 | 78.9646 |
| S4 | Aspheric | 7.2588 | 0.1290 | | | | −1.5766 |
| S5 | Aspheric | 3.7291 | 0.9262 | 1.55 | 56.1 | 8.46 | −6.8600 |
| S6 | Aspheric | 17.6785 | 0.0250 | | | | 51.7634 |
| S7 | Aspheric | 10.5161 | 0.7903 | 1.55 | 56.1 | 13.65 | 11.4021 |
| S8 | Aspheric | −24.9419 | 0.0250 | | | | −99.0000 |
| S9 | Aspheric | 3.5570 | 0.3800 | 1.67 | 20.4 | −8.03 | −4.9054 |
| S10 | Aspheric | 2.0452 | 0.8953 | | | | 0.4653 |
| S11 | Aspheric | −100.0000 | 0.7578 | 1.67 | 20.4 | 15.16 | −99.0000 |
| S12 | Aspheric | −9.2048 | 0.5576 | | | | 23.0336 |
| S13 | Aspheric | −19.0497 | 0.7493 | 1.55 | 56.1 | −6.40 | 82.5452 |
| S14 | Aspheric | 4.3384 | 0.1656 | | | | −24.2224 |
| S15 | Spherical | Infinite | 0.2100 | 1.52 | 64.2 | | |
| S16 | Spherical | Infinite | 0.5543 | | | | |
| S17 | Spherical | Infinite | | | | | |

In example 3, the object-side surface and the image-side surface of any one of the first lens E1 to the seventh lens E7 are aspheric. Table 6 below shows high-order coefficients A4, A6, A8, A10, A12, A14, A16, A18 and A20 applicable to each aspheric surface S1 to S14 in example 3.

TABLE 6

| Surface number | A4 | A6 | A8 | A10 | A12 | A14 | A16 | A18 | A20 |
|---|---|---|---|---|---|---|---|---|---|
| S1 | −4.7830E−04 | −4.7776E−04 | 1.3389E−05 | −4.1345E−05 | 1.4369E−05 | −5.0410E−06 | 1.0017E−06 | −8.9718E−08 | 2.9705E−09 |
| S2 | 1.4711E−02 | −1.8850E−02 | 1.0461E−02 | −3.8669E−03 | 9.5375E−04 | −1.5414E−04 | 1.5692E−05 | −9.1252E−07 | 2.3162E−08 |
| S3 | 1.9552E−02 | −1.8155E−02 | 1.0992E−02 | −3.9591E−03 | 9.1774E−04 | −1.3735E−04 | 1.2778E−05 | −6.7641E−07 | 1.5562E−08 |
| S4 | 1.4054E−02 | −9.8763E−03 | 4.1132E−03 | 1.4371E−04 | −5.8023E−04 | 2.0832E−04 | −3.7471E−05 | 3.5066E−06 | −1.3545E−07 |
| S5 | 6.3972E−03 | −5.0339E−03 | −2.3590E−03 | 3.1470E−03 | −1.1742E−03 | 2.2307E−04 | −2.3081E−05 | 1.1385E−06 | −1.4542E−08 |
| S6 | 2.1223E−03 | −4.3980E−02 | 4.1703E−02 | −1.8143E−02 | 4.3094E−03 | −5.7160E−04 | 3.7688E−05 | −6.3330E−07 | −3.0576E−08 |
| S7 | 1.7332E−02 | −5.1107E−02 | 4.7694E−02 | −2.0637E−02 | 4.6757E−03 | −5.4287E−04 | 2.5689E−05 | 0.0000E+00 | 0.0000E+00 |
| S8 | 8.0466E−03 | −1.2448E−02 | 7.4328E−03 | −3.1062E−03 | 8.1737E−04 | −1.1629E−04 | 6.7949E−06 | 0.0000E+00 | 0.0000E+00 |
| S9 | −2.8214E−02 | 1.5522E−02 | −5.2044E−03 | 5.4097E−04 | 3.9431E−04 | −1.4667E−04 | 1.4883E−05 | 0.0000E+00 | 0.0000E+00 |
| S10 | −6.3897E−02 | 2.7255E−02 | −1.4078E−02 | 4.7121E−03 | −1.3914E−03 | 3.6636E−04 | −7.3942E−05 | 0.0000E+00 | 0.0000E+00 |
| S11 | −2.4710E−02 | 2.1671E−03 | −6.5959E−03 | 3.6493E−03 | −1.3627E−03 | 1.5128E−04 | 0.0000E+00 | 0.0000E+00 | 0.0000E+00 |
| S12 | −2.7449E−02 | 1.3531E−02 | −1.7219E−02 | 1.5931E−02 | −9.8222E−03 | 3.6421E−03 | −7.4008E−04 | 6.4457E−05 | 0.0000E+00 |
| S13 | −8.7319E−02 | 2.6665E−02 | −9.3828E−03 | 4.4604E−03 | −1.8044E−03 | 3.9525E−04 | −3.1655E−05 | 0.0000E+00 | 0.0000E+00 |
| S14 | −4.0032E−02 | 6.6626E−03 | −4.9699E−04 | −2.4510E−04 | 7.4112E−05 | −8.8767E−06 | 4.3216E−07 | 0.0000E+00 | 0.0000E+00 |

Figures 6C, 6D:
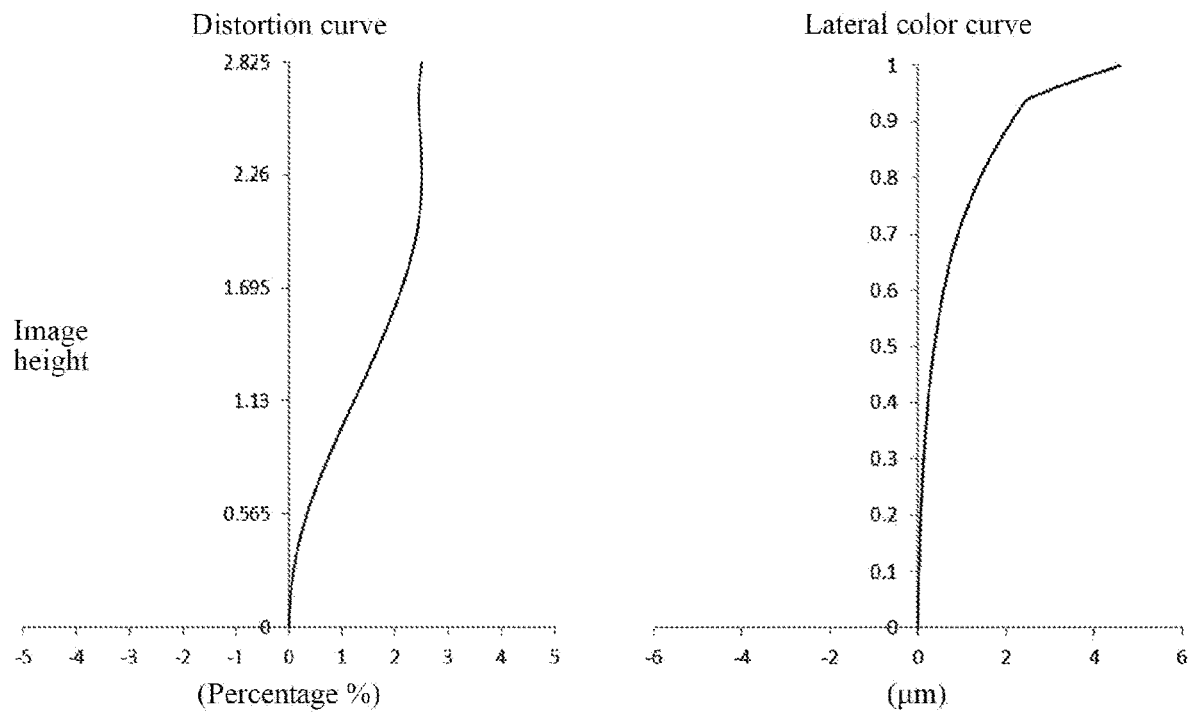

FIG. 6A illustrates longitudinal aberration curves of the optical imaging lens assembly according to example 3, representing the deviations of focal points converged by light of different wavelengths which passes through the lens assembly. FIG. 6B illustrates astigmatic curves of the optical imaging lens assembly according to example 3, representing the curvatures of a tangential plane and the curvatures of a sagittal plane. FIG. 6C illustrates a distortion curve of the optical imaging lens assembly according to example 3, representing the amounts of distortion corresponding to different image heights. FIG. 6D illustrates a lateral color curve of the optical imaging lens assembly according to example 3, representing the deviations of different image heights on an imaging plane formed by light passing through the lens assembly. It can be seen from FIG. 6A to FIG. 6D that the optical imaging lens assembly provided in example 3 may achieve good image quality.

Example 4

Figure 7:
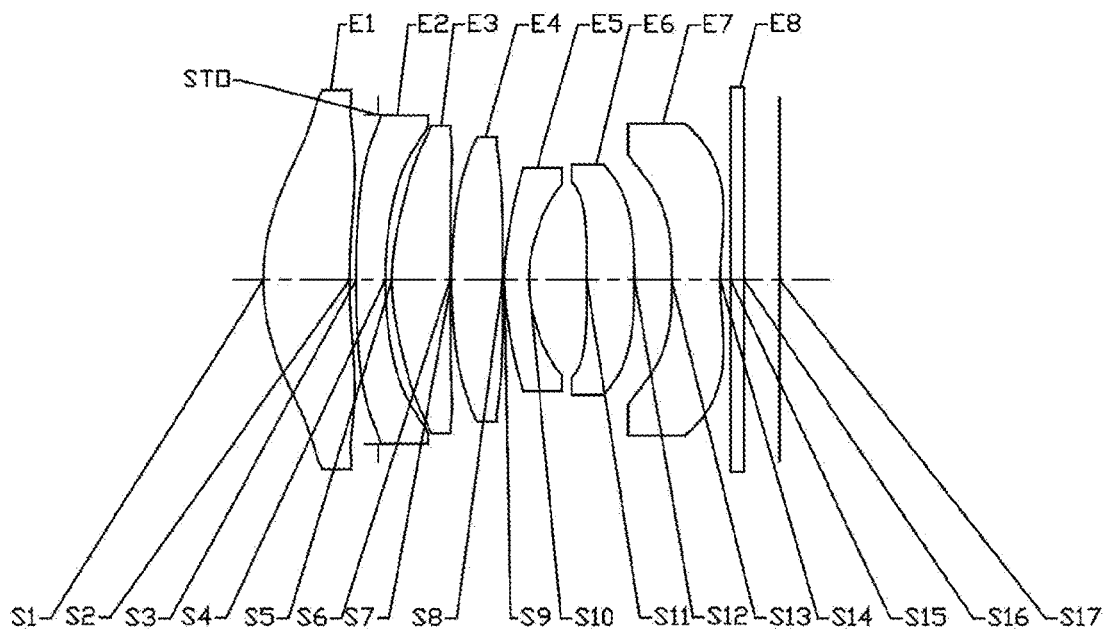
FIG. 7 illustrates a schematic structural diagram of an optical imaging lens assembly according to example 4 of the present disclosure.

An optical imaging lens assembly according to example 4 of the present disclosure is described below with reference to FIG. 7 to FIG. 8D. FIG. 7 shows a schematic structural diagram of the optical imaging lens assembly according to example 4 of the present disclosure.

As shown in FIG. 7, the optical imaging lens assembly includes a first lens E1, a stop STO, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has a positive refractive power, an object-side surface S1 thereof is convex, and an image-side surface S2 thereof is concave. The second lens E2 has a negative refractive power, an object-side surface S3 thereof is convex, and an image-side surface S4 thereof is concave. The third lens E3 has a positive refractive power, an object-side surface S5 thereof is convex, and an image-side surface S6 thereof is concave. The fourth lens E4 has a positive refractive power, an object-side surface S7 thereof is convex, and an image-side surface S8 thereof is concave. The fifth lens E5 has a negative refractive power, an object-side surface S9 thereof is convex, and an image-side surface S10 thereof is concave. The sixth lens E6 has a positive refractive power, an object-side surface S11 thereof is concave, and an image-side surface S12 thereof is convex. The seventh lens E7 has a negative refractive power, an object-side surface S13 thereof is concave, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=6.65 mm, a distance TTL along the optical axis from the object-side surface S1 of the first lens E1 to the imaging plane S17 satisfies TTL=8.00 mm, half of a diagonal length ImgH of an effective pixel area on the imaging plane S17 satisfies ImgH=2.83 mm, and half of a maximum field-of-view Semi-FOV of the optical imaging lens assembly satisfies Semi-FOV=22.5°.

Table 7 is a table illustrating basic parameters of the optical imaging lens assembly of example 4, wherein the units of the radius of curvature, the thickness/distance and the focal length are millimeter (mm).

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 3.3535 | 1.3379 | 1.55 | 56.1 | 8.47 | −0.6965 |
| S2 | Aspheric | 10.4995 | 0.4420 | | | | −99.0000 |
| STO | Spherical | Infinite | −0.3420 | | | | |
| S3 | Aspheric | 25.6925 | 0.4500 | 1.67 | 20.4 | −14.38 | 82.3215 |
| S4 | Aspheric | 6.9307 | 0.1043 | | | | −2.4564 |
| S5 | Aspheric | 3.6363 | 0.8979 | 1.55 | 56.1 | 8.21 | −6.7700 |
| S6 | Aspheric | 17.5413 | 0.0250 | | | | 52.2613 |
| S7 | Aspheric | 8.6754 | 0.7920 | 1.55 | 56.1 | 16.28 | 8.7258 |
| S8 | Aspheric | 350.0000 | 0.0250 | | | | 99.0000 |
| S9 | Aspheric | 3.3985 | 0.3800 | 1.67 | 20.4 | −8.74 | −5.1737 |
| S10 | Aspheric | 2.0504 | 0.9033 | | | | 0.5028 |
| S11 | Aspheric | −200.0000 | 0.7417 | 1.67 | 20.4 | 14.82 | 99.0000 |
| S12 | Aspheric | −9.4256 | 0.5752 | | | | 24.4852 |
| S13 | Aspheric | −14.6379 | 0.7500 | 1.55 | 56.1 | −6.44 | 48.2357 |
| S14 | Aspheric | 4.7064 | 0.1603 | | | | −29.5939 |
| S15 | Spherical | Infinite | 0.2100 | 1.52 | 64.2 | | |
| S16 | Spherical | Infinite | 0.5473 | | | | |
| S17 | Spherical | Infinite | | | | | |

In example 4, the object-side surface and the image-side surface of any one of the first lens E1 to the seventh lens E7 are aspheric. Table 8 below shows high-order coefficients A4, A6, A8, A10, A12, A14, A16, A18 and A20 applicable to each aspheric surface S1 to S14 in example 4.

TABLE 8

| Surface number | A4 | A6 | A8 | A10 | A12 | A14 | A16 | A18 | A20 |
|---|---|---|---|---|---|---|---|---|---|
| S1 | −4.4761E−04 | −6.0994E−04 | 1.6460E−04 | −1.1280E−04 | 3.3652E−05 | −7.5923E−06 | 1.1172E−06 | −8.5072E−08 | 2.5428E−09 |
| S2 | 2.4544E−02 | −2.9680E−02 | 1.5334E−02 | −4.9269E−03 | 1.0406E−03 | −1.4533E−04 | 1.2995E−05 | −6.7492E−07 | 1.5521E−08 |
| S3 | 3.4547E−02 | −3.6207E−02 | 2.0590E−02 | −6.8932E−03 | 1.4734E−03 | −2.0193E−04 | 1.6855E−05 | −7.5568E−07 | 1.2843E−08 |
| S4 | 2.9701E−02 | −3.2122E−02 | 1.7167E−02 | −3.7275E−03 | −1.5537E−04 | 2.8027E−04 | −6.6112E−05 | 6.9370E−06 | −2.8448E−07 |
| S5 | 1.6870E−02 | −1.8722E−02 | 3.6710E−03 | 2.8182E−03 | −1.8450E−03 | 4.9037E−04 | −6.8314E−05 | 4.7424E−06 | −1.2260E−07 |
| S6 | 2.6503E−03 | −4.4725E−02 | 4.3010E−02 | −1.9082E−02 | 4.5056E−03 | −5.2887E−04 | 1.4042E−05 | 2.8055E−06 | −2.0070E−07 |
| S7 | 1.9714E−02 | −5.4511E−02 | 5.2273E−02 | −2.3888E−02 | 5.7864E−03 | −7.2188E−04 | 3.6701E−05 | 0.0000E+00 | 0.0000E+00 |
| S8 | 1.9193E−03 | −7.6508E−03 | 5.1276E−03 | −2.8550E−03 | 9.6138E−04 | −1.6224E−04 | 1.0730E−05 | 0.0000E+00 | 0.0000E+00 |
| S9 | −3.2335E−02 | 1.7988E−02 | −4.8682E−03 | −9.0796E−04 | 1.2225E−03 | −3.4019E−04 | 3.1592E−05 | 0.0000E+00 | 0.0000E+00 |
| S10 | −6.3239E−02 | 2.4287E−02 | −9.7436E−03 | 1.3380E−03 | 7.4451E−05 | 4.3866E−05 | −4.8751E−05 | 0.0000E+00 | 0.0000E+00 |
| S11 | −2.5476E−02 | 1.4637E−03 | −6.1258E−03 | 3.2277E−03 | −1.2090E−03 | 1.2546E−04 | 0.0000E+00 | 0.0000E+00 | 0.0000E+00 |
| S12 | −2.6412E−02 | 1.1479E−02 | −1.5077E−02 | 1.4092E−02 | −8.8847E−03 | 3.3767E−03 | −7.0314E−04 | 6.2791E−05 | 0.0000E+00 |
| S13 | −8.2945E−02 | 2.5430E−02 | −9.2961E−03 | 4.4787E−03 | −1.8044E−03 | 3.9525E−04 | −3.1655E−05 | 0.0000E+00 | 0.0000E+00 |
| S14 | −3.9105E−02 | 5.9804E−03 | −4.1502E−04 | −2.3951E−04 | 7.1609E−05 | −8.6953E−06 | 4.3216E−07 | 0.0000E+00 | 0.0000E+00 |

Figure 8A:
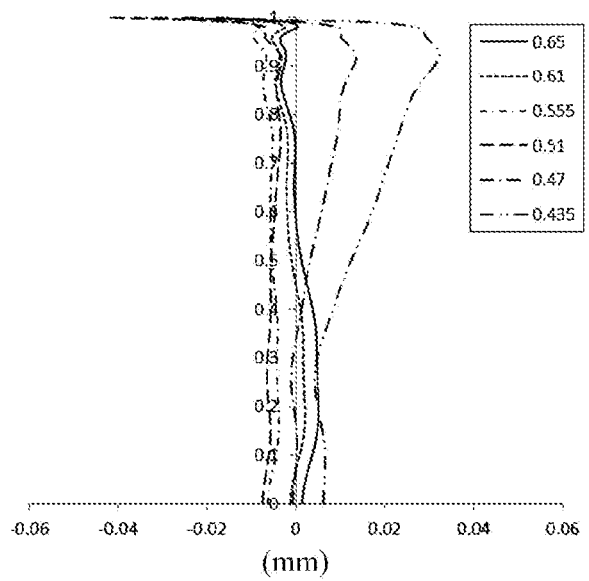
FIGS. 8A to 8D illustrate longitudinal aberration curves, astigmatic curves, a distortion curve, and a lateral color curve of the optical imaging lens assembly of the example 4, respectively.
Figure 8B:
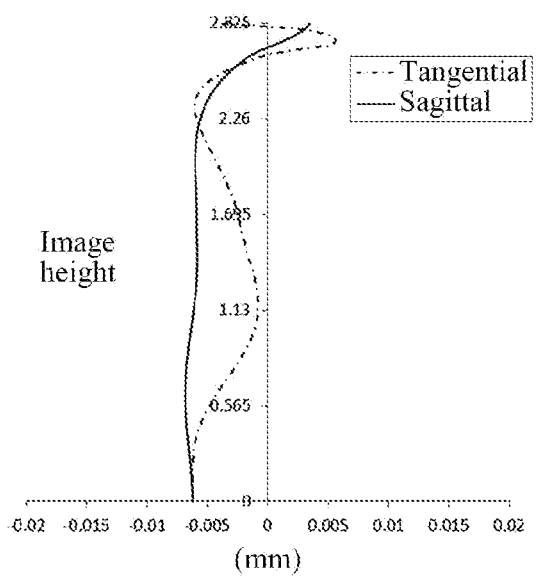
Figure 8C:
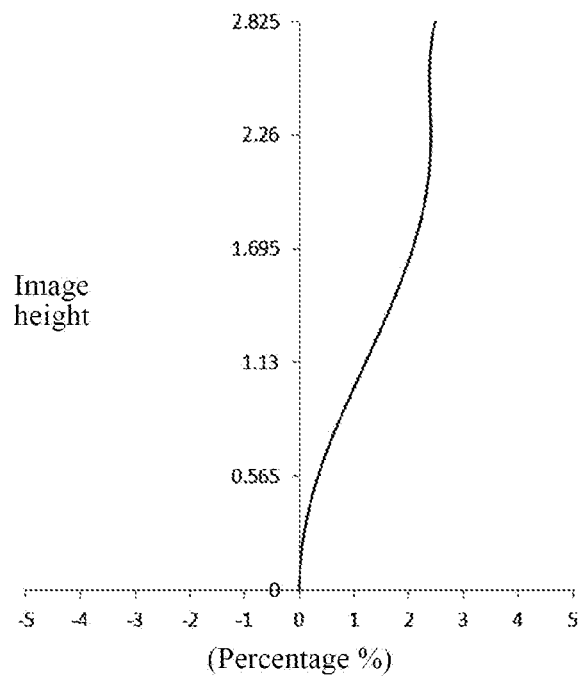
Figure 8D:
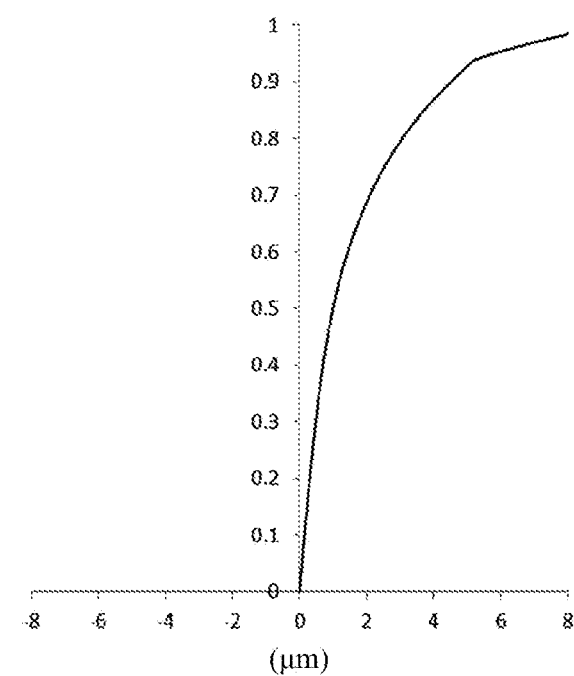

FIG. 8A illustrates longitudinal aberration curves of the optical imaging lens assembly according to example 4, representing the deviations of focal points converged by light of different wavelengths which passes through the lens assembly. FIG. 8B illustrates astigmatic curves of the optical imaging lens assembly according to example 4, representing the curvatures of a tangential plane and the curvatures of a sagittal plane. FIG. 8C illustrates a distortion curve of the optical imaging lens assembly according to example 4, representing the amounts of distortion corresponding to different image heights. FIG. 8D illustrates a lateral color curve of the optical imaging lens assembly according to example 4, representing the deviations of different image heights on an imaging plane formed by light passing through the lens assembly. It can be seen from FIG. 8A to FIG. 8D that the optical imaging lens assembly provided in example 4 may achieve good image quality.

Example 5

Figure 9:
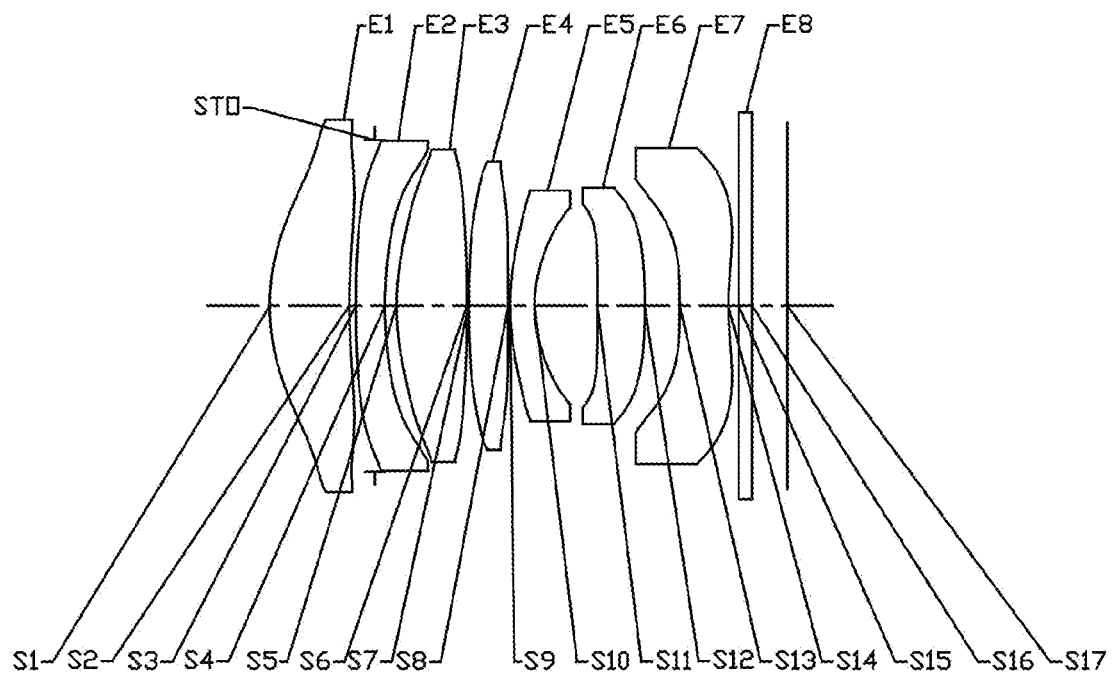
FIG. 9 illustrates a schematic structural diagram of an optical imaging lens assembly according to example 5 of the present disclosure.

An optical imaging lens assembly according to example 5 of the present disclosure is described below with reference to FIG. 9 to FIG. 10D. FIG. 9 shows a schematic structural diagram of the optical imaging lens assembly according to example 5 of the present disclosure.

As shown in FIG. 9, the optical imaging lens assembly includes a first lens E1, a stop STO, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has a positive refractive power, an object-side surface S1 thereof is convex, and an image-side surface S2 thereof is concave. The second lens E2 has a negative refractive power, an object-side surface S3 thereof is convex, and an image-side surface S4 thereof is concave. The third lens E3 has a positive refractive power, an object-side surface S5 thereof is convex, and an image-side surface S6 thereof is convex. The fourth lens E4 has a positive refractive power, an object-side surface S7 thereof is convex, and an image-side surface S8 thereof is convex. The fifth lens E5 has a negative refractive power, an object-side surface S9 thereof is convex, and an image-side surface S10 thereof is concave. The sixth lens E6 has a positive refractive power, an object-side surface S11 thereof is convex, and an image-side surface S12 thereof is convex. The seventh lens E7 has a negative refractive power, an object-side surface S13 thereof is concave, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=6.60 mm, a distance TTL along the optical axis from the object-side surface S1 of the first lens E1 to the imaging plane S17 satisfies TTL=8.00 mm, half of a diagonal length ImgH of an effective pixel area on the imaging plane S17 satisfies ImgH=2.83 mm, and half of a maximum field-of-view Semi-FOV of the optical imaging lens assembly satisfies Semi-FOV=22.6°.

Table 9 is a table illustrating basic parameters of the optical imaging lens assembly of example 5, wherein the units of the radius of curvature, the thickness/distance and the focal length are millimeter (mm).

TABLE 9

| Surface number | Surface type | Radius of curvature | Thickness/ Distance | Material | | Focal length | Conic coefficient |
|---|---|---|---|---|---|---|---|
| | | | | Refractive index | Abbe number | | |
| OBJ | Spherical | Infinite | Infinite | | | | |
| S1 | Aspheric | 3.3619 | 1.2297 | 1.55 | 56.1 | 8.51 | −0.7185 |
| S2 | Aspheric | 10.5800 | 0.3953 | | | | −99.0000 |
| STO | Spherical | Infinite | −0.2944 | | | | |
| S3 | Aspheric | 25.5605 | 0.4500 | 1.67 | 20.4 | −15.64 | 80.1368 |
| S4 | Aspheric | 7.3510 | 0.1778 | | | | −2.0989 |
| S5 | Aspheric | 4.0319 | 1.0909 | 1.55 | 56.1 | 7.21 | −7.7120 |
| S6 | Aspheric | −150.0000 | 0.0250 | | | | −99.0000 |
| S7 | Aspheric | 13.0243 | 0.6118 | 1.55 | 56.1 | 20.00 | 12.5078 |
| S8 | Aspheric | −66.3979 | 0.0250 | | | | −99.0000 |
| S9 | Aspheric | 3.4699 | 0.3800 | 1.67 | 20.4 | −8.12 | −4.8609 |

TABLE 9-continued

| Surface number | Surface type | Radius of curvature | Thickness/ Distance | Material Refractive index | Abbe number | Focal length | Conic coefficient |
|---|---|---|---|---|---|---|---|
| S10 | Aspheric | 2.0217 | 0.9747 | | | | 0.3688 |
| S11 | Aspheric | 62.2936 | 0.7297 | 1.67 | 20.4 | 15.37 | 99.0000 |
| S12 | Aspheric | −12.2060 | 0.5435 | | | | 40.1951 |
| S13 | Aspheric | −16.2312 | 0.7500 | 1.55 | 56.1 | −6.30 | 58.6743 |
| S14 | Aspheric | 4.4369 | 0.1576 | | | | −24.1905 |
| S15 | Spherical | Infinite | 0.2100 | 1.52 | 64.2 | | |
| S16 | Spherical | Infinite | 0.5430 | | | | |
| S17 | Spherical | Infinite | | | | | |

In example 5, the object-side surface and the image-side surface of any one of the first lens E1 to the seventh lens E7 are aspheric. Table 10 below shows high-order coefficients A4, A6, A8, A10, A12, A14, A16, A18 and A20 applicable to each aspheric surface S1 to S14 in example 5.

TABLE 10

| Surface number | A4 | A6 | A8 | A10 | A12 | A14 | A16 | A18 | A20 |
|---|---|---|---|---|---|---|---|---|---|
| S1 | −7.3448E−04 | −4.4377E−04 | −3.5809E−05 | −1.0387E−06 | −2.9789E−06 | −1.0848E−06 | 5.2880E−07 | −6.1397E−08 | 2.2929E−09 |
| S2 | 1.5688E−02 | −1.8897E−02 | 1.0025E−02 | −3.5407E−03 | 8.4346E−04 | −1.3307E−04 | 1.3331E−05 | −7.6611E−07 | 1.9220E−08 |
| S3 | 2.2117E−02 | −2.1357E−02 | 1.2482E−02 | −4.4192E−03 | 1.0436E−03 | −1.6564E−04 | 1.6956E−05 | −1.0144E−06 | 2.6791E−08 |
| S4 | 1.8412E−02 | −1.8237E−02 | 1.1131E−02 | −3.7973E−03 | 9.7064E−04 | −2.0151E−04 | 3.0412E−05 | −2.7829E−06 | 1.1159E−07 |
| S5 | 7.9077E−03 | −1.1089E−02 | 3.2269E−03 | 5.6985E−04 | −4.6185E−04 | 9.1589E−05 | −5.9193E−06 | −3.2324E−07 | 4.3641E−08 |
| S6 | −3.0616E−02 | 1.6295E−02 | −2.0568E−03 | −1.2565E−03 | 5.7762E−04 | −1.0132E−04 | 7.6703E−06 | −1.0413E−07 | −9.5753E−09 |
| S7 | −1.3500E−02 | 8.1528E−03 | 4.8913E−03 | −5.1689E−03 | 1.6732E−03 | −2.4341E−04 | 1.3736E−05 | 0.0000E+00 | 0.0000E+00 |
| S8 | 6.8976E−03 | −6.4749E−03 | 1.1218E−03 | −3.1321E−04 | 1.8749E−04 | −4.5579E−05 | 3.7520E−06 | 0.0000E+00 | 0.0000E+00 |
| S9 | −3.1965E−02 | 2.3703E−02 | −1.3292E−02 | 4.8948E−03 | −8.8172E−04 | 3.9161E−05 | 4.4926E−06 | 0.0000E+00 | 0.0000E+00 |
| S10 | −6.5303E−02 | 2.9473E−02 | −1.5038E−02 | 4.9975E−03 | −1.3270E−03 | 2.1799E−04 | −4.0942E−05 | 0.0000E+00 | 0.0000E+00 |
| S11 | −2.3672E−02 | 1.1040E−03 | −5.1170E−03 | 2.3810E−03 | −7.8545E−04 | 5.4572E−05 | 0.0000E+00 | 0.0000E+00 | 0.0000E+00 |
| S12 | −2.7513E−02 | 1.2762E−02 | −1.6916E−02 | 1.5059E−02 | −8.9400E−03 | 3.1932E−03 | −6.2635E−04 | 5.2691E−05 | 0.0000E+00 |
| S13 | −8.5303E−02 | 2.6308E−02 | −9.4518E−03 | 4.4777E−03 | −1.8044E−03 | 3.9525E−04 | −3.1655E−05 | 0.0000E+00 | 0.0000E+00 |
| S14 | −4.0590E−02 | 7.0349E−03 | −5.6748E−04 | −2.4521E−04 | 7.6954E−05 | −9.1829E−06 | 4.3216E−07 | 0.0000E+00 | 0.0000E+00 |

Figure 10A:
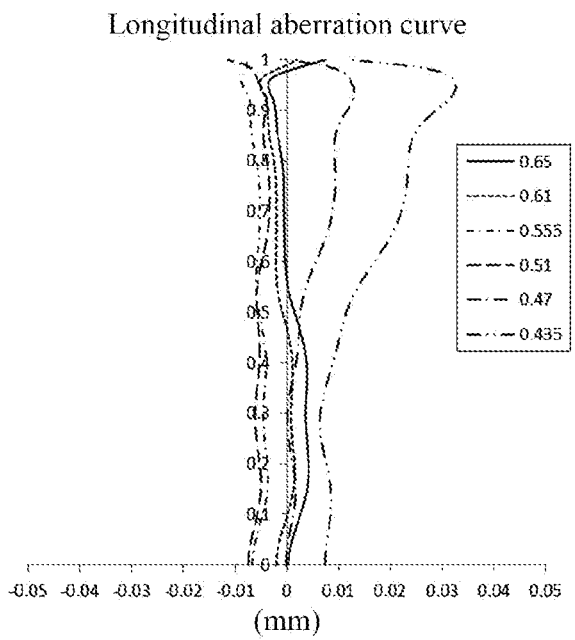
Figure 10B:
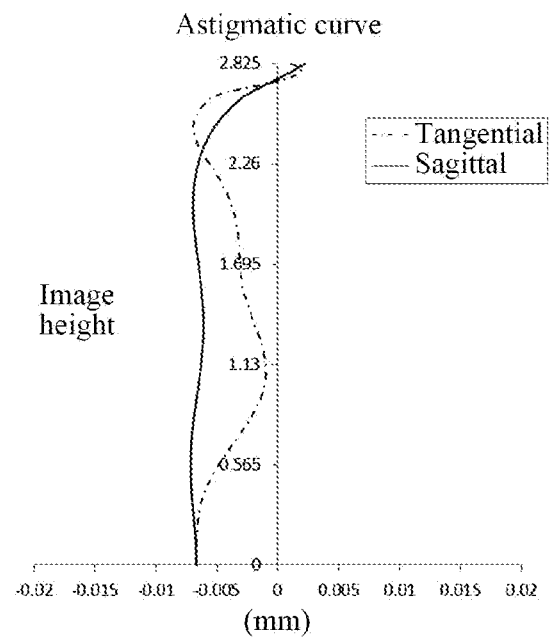

FIG. 10A illustrates longitudinal aberration curves of the optical imaging lens assembly according to example 5, representing the deviations of focal points converged by light of different wavelengths which passes through the lens assembly. FIG. 10B illustrates astigmatic curves of the optical imaging lens assembly according to example 5, representing the curvatures of a tangential plane and the curvatures of a sagittal plane. FIG. 10C illustrates a distortion curve of the optical imaging lens assembly according to example 5, representing the amounts of distortion corresponding to different image heights. FIG. 10D illustrates a lateral color curve of the optical imaging lens assembly according to example 5, representing the deviations of different image heights on an imaging plane formed by light passing through the lens assembly. It can be seen from FIG. 10A to FIG. 10D that the optical imaging lens assembly provided in example 5 may achieve good image quality.

Example 6

An optical imaging lens assembly according to example 6 of the present disclosure is described below with reference to FIG. 11 to FIG. 12D. FIG. 11 shows a schematic structural diagram of the optical imaging lens assembly according to example 6 of the present disclosure.

As shown in FIG. 11, the optical imaging lens assembly includes a first lens E1, a stop STO, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has a positive refractive power, an object-side surface S1 thereof is convex, and an image-side surface S2 thereof is concave. The second lens E2 has a negative refractive power, an object-side surface S3 thereof is concave, and an image-side surface S4 thereof is concave. The third lens E3 has a positive refractive power, an object-side surface S5 thereof is convex, and an image-side surface S6 thereof is concave. The fourth lens E4 has a positive refractive power, an object-side surface S7 thereof is convex, and an image-side surface S8 thereof is convex. The fifth lens E5 has a negative refractive power, an object-side surface S9 thereof is convex, and an image-side surface S10 thereof is concave. The sixth lens E6 has a positive refractive power, an object-side surface S11 thereof is convex, and an image-side surface S12 thereof is convex. The seventh lens E7 has a negative refractive power, an object-side surface S13 thereof is concave, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=6.52 mm, a distance TTL along the optical axis from the object-side surface S1 of the first lens E1 to the imaging plane S17 satisfies TTL=8.00 mm, half of a diagonal length ImgH of an effective pixel area on the imaging plane S17 satisfies ImgH=2.83 mm, and half of a maximum field-of-view Semi-FOV of the optical imaging lens assembly satisfies Semi-FOV=22.9°.

Table 11 is a table illustrating basic parameters of the optical imaging lens assembly of example 6, wherein the units of the radius of curvature, the thickness/distance and the focal length are millimeter (mm).

TABLE 11

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| S1 | Aspheric | 3.4337 | 1.1965 | 1.55 | 56.1 | 8.36 | −0.7071 |
| S2 | Aspheric | 12.1739 | 0.3702 | | | | −94.8666 |
| STO | Spherical | Infinite | −0.1862 | | | | |
| S3 | Aspheric | −400.0000 | 0.4500 | 1.67 | 20.4 | −15.39 | −99.0000 |
| S4 | Aspheric | 10.5300 | 0.2479 | | | | −0.0432 |
| S5 | Aspheric | 4.3314 | 0.8281 | 1.55 | 56.1 | 8.57 | −11.5230 |
| S6 | Aspheric | 54.7964 | 0.0250 | | | | 99.0000 |
| S7 | Aspheric | 9.4158 | 0.7862 | 1.55 | 56.1 | 12.52 | 12.0723 |
| S8 | Aspheric | −24.1899 | 0.0250 | | | | −93.8847 |
| S9 | Aspheric | 3.2391 | 0.3800 | 1.67 | 20.4 | −7.73 | −4.2830 |
| S10 | Aspheric | 1.8956 | 0.9747 | | | | 0.1969 |
| S11 | Aspheric | 33.0269 | 0.6739 | 1.67 | 20.4 | 15.95 | 99.0000 |
| S12 | Aspheric | −15.5428 | 0.5836 | | | | 66.9131 |
| S13 | Aspheric | −17.9339 | 0.7500 | 1.55 | 56.1 | −6.27 | 74.8487 |
| S14 | Aspheric | 4.2903 | 0.1501 | | | | −24.2393 |
| S15 | Spherical | Infinite | 0.2100 | 1.52 | 64.2 | | |
| S16 | Spherical | Infinite | 0.5351 | | | | |
| S17 | Spherical | Infinite | | | | | |

In example 6, the object-side surface and the image-side surface of any one of the first lens E1 to the seventh lens E7 are aspheric. Table 12 below shows high-order coefficients A4, A6, A8, A10, A12, A14, A16, A18 and A20 applicable to each aspheric surface S1 to S14 in example 6.

TABLE 12

| Surface number | A4 | A6 | A8 | A10 | A12 | A14 | A16 | A18 | A20 |
|---|---|---|---|---|---|---|---|---|---|
| S1 | −4.0254E−04 | −4.7246E−04 | −1.9121E−05 | −3.6981E−05 | 1.7220E−05 | −6.5871E−06 | 1.3285E−06 | −1.2081E−07 | 4.0707E−09 |
| S2 | 7.2873E−03 | −8.0100E−03 | 3.4393E−03 | −1.1583E−03 | 2.9065E−04 | −5.0244E−05 | 5.5885E−06 | −3.5549E−07 | 9.7817E−09 |
| S3 | 1.2805E−02 | −8.6229E−03 | 5.4836E−03 | −2.1030E−03 | 5.5730E−04 | −1.0113E−04 | 1.1832E−05 | −8.0195E−07 | 2.3621E−08 |
| S4 | 4.6124E−03 | −2.6842E−03 | 3.1349E−03 | −1.2520E−03 | 3.6428E−04 | −8.2096E−05 | 1.2867E−05 | −1.2333E−06 | 5.2505E−08 |
| S5 | 5.7012E−05 | −2.4453E−03 | −9.5551E−04 | 1.2377E−03 | −3.4562E−04 | 2.7629E−05 | 5.1687E−06 | −1.2736E−06 | 7.7641E−08 |
| S6 | −1.4991E−02 | −7.9517E−03 | 1.2674E−02 | −6.3780E−03 | 1.7436E−03 | −2.7133E−04 | 2.1660E−05 | −5.9011E−07 | −9.4747E−09 |
| S7 | 1.7289E−03 | −1.3776E−02 | 1.6671E−02 | −8.1326E−03 | 2.0277E−03 | −2.5741E−04 | 1.3224E−05 | 0.0000E+00 | 0.0000E+00 |
| S8 | 1.4392E−02 | −1.7012E−02 | 7.8276E−03 | −2.5798E−03 | 6.1528E−04 | −8.5913E−05 | 5.0267E−06 | 0.0000E+00 | 0.0000E+00 |
| S9 | −2.1239E−02 | 1.3040E−02 | −7.2417E−03 | 2.5143E−03 | −2.6943E−04 | −4.2354E−05 | 7.7965E−06 | 0.0000E+00 | 0.0000E+00 |
| S10 | −6.5187E−02 | 3.2314E−02 | −2.0589E−02 | 9.3660E−03 | −3.1485E−03 | 7.3947E−04 | −1.0242E−04 | 0.0000E+00 | 0.0000E+00 |
| S11 | −2.3060E−02 | 1.8657E−03 | −3.9003E−03 | 1.7544E−03 | −6.0861E−04 | 7.3564E−05 | 0.0000E+00 | 0.0000E+00 | 0.0000E+00 |
| S12 | −2.7728E−02 | 9.1047E−03 | −8.6677E−03 | 6.3857E−03 | −3.5864E−03 | 1.2530E−03 | −2.4212E−04 | 2.0357E−05 | 0.0000E+00 |
| S13 | −8.7900E−02 | 2.6286E−02 | −9.4070E−03 | 4.4789E−03 | −1.8044E−03 | 3.9525E−04 | −3.1655E−05 | 0.0000E+00 | 0.0000E+00 |
| S14 | −3.9670E−02 | 6.4306E−03 | −4.4362E−04 | −2.5280E−04 | 7.5550E−05 | −8.9728E−06 | 4.3216E−07 | 0.0000E+00 | 0.0000E+00 |

Figure 12A:
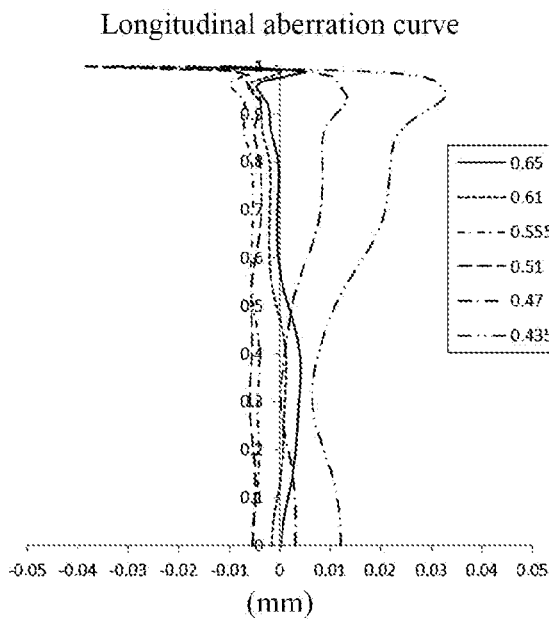
FIGS. 12A to 12D illustrate longitudinal aberration curves, astigmatic curves, a distortion curve, and a lateral color curve of the optical imaging lens assembly of the example 6, respectively.
Figure 12B:
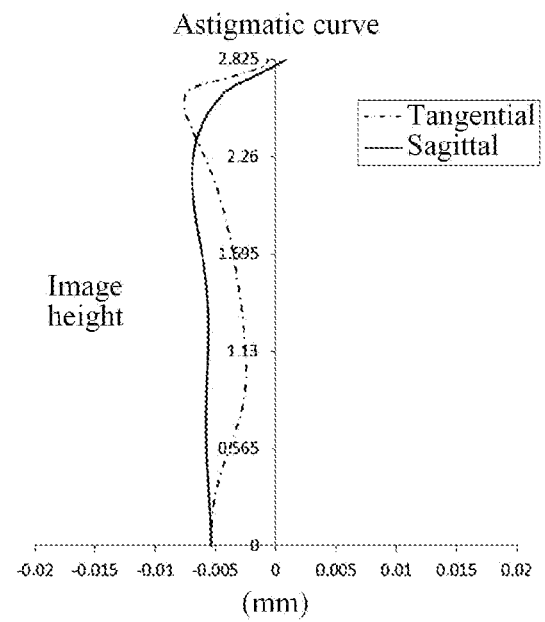
Figure 12C:
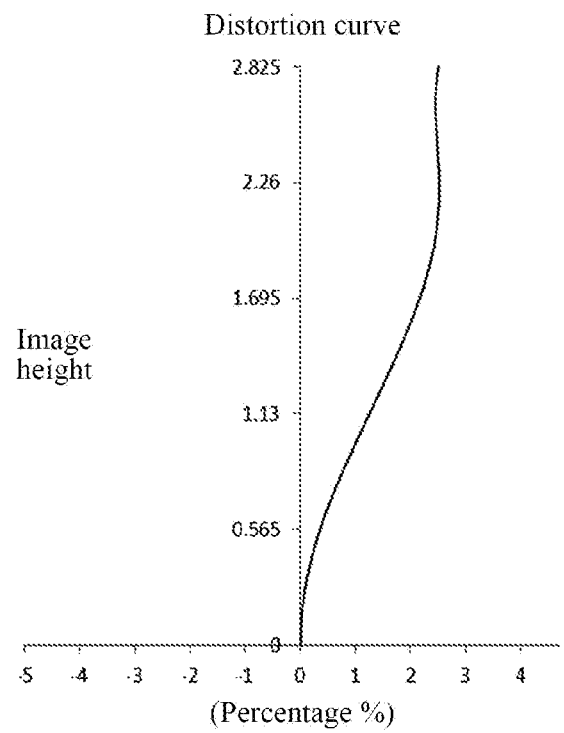
Figure 12D:
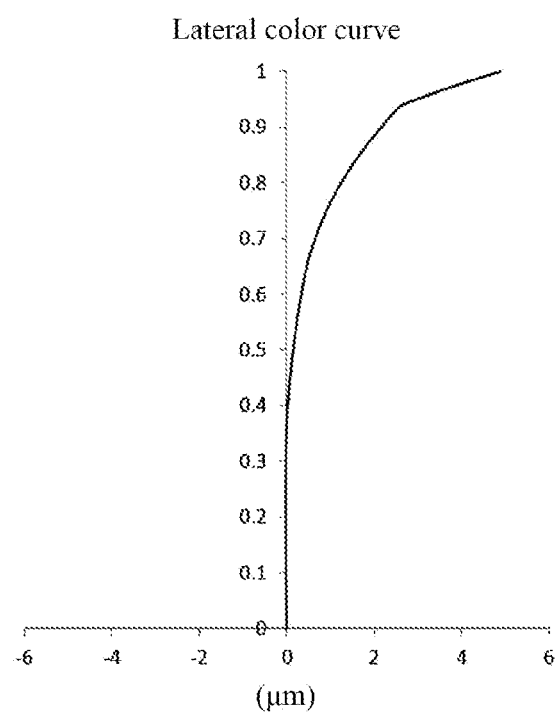

FIG. 12A illustrates longitudinal aberration curves of the optical imaging lens assembly according to example 6, representing the deviations of focal points converged by light of different wavelengths which passes through the lens assembly. FIG. 12B illustrates astigmatic curves of the optical imaging lens assembly according to example 6, representing the curvatures of a tangential plane and the curvatures of a sagittal plane. FIG. 12C illustrates a distortion curve of the optical imaging lens assembly according to example 6, representing the amounts of distortion corresponding to different image heights. FIG. 12D illustrates a lateral color curve of the optical imaging lens assembly according to example 6, representing the deviations of different image heights on an imaging plane formed by light passing through the lens assembly. It can be seen from FIG. 12A to FIG. 12D that the optical imaging lens assembly provided in example 6 may achieve good image quality.

Example 7

Figure 13:
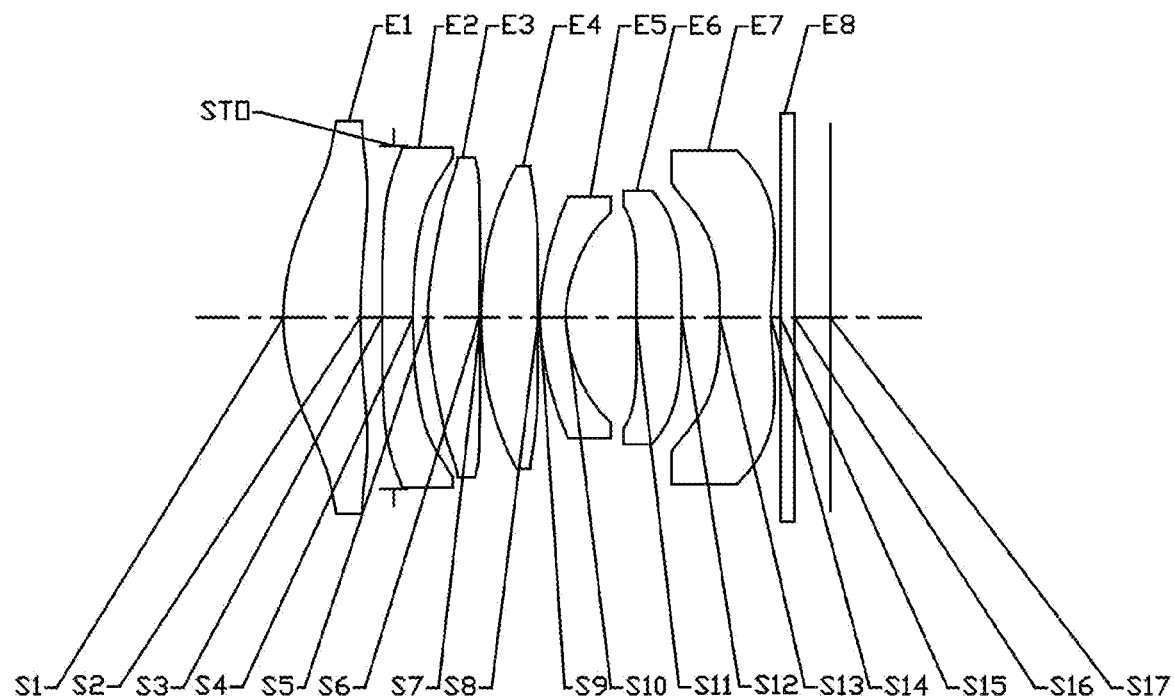
FIG. 13 illustrates a schematic structural diagram of an optical imaging lens assembly according to example 7 of the present disclosure.

An optical imaging lens assembly according to example 7 of the present disclosure is described below with reference to FIG. 13 to FIG. 14D. FIG. 13 shows a schematic structural diagram of the optical imaging lens assembly according to example 7 of the present disclosure.

As shown in FIG. 13, the optical imaging lens assembly includes a first lens E1, a stop STO, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has a positive refractive power, an object-side surface S1 thereof is convex, and an image-side surface S2 thereof is concave. The second lens E2 has a negative refractive power, an object-side surface S3 thereof is concave, and an image-side surface S4 thereof is concave. The third lens E3 has a positive refractive power, an object-side surface S5 thereof is convex, and an image-side surface S6 thereof is concave. The fourth lens E4 has a positive refractive power, an object-side surface S7 thereof is convex, and an image-side surface S8 thereof is concave. The fifth lens E5 has a negative refractive power, an object-side surface S9 thereof is convex, and an image-side surface S10 thereof is concave. The sixth lens E6 has a positive refractive power, an object-side surface S11 thereof is convex, and an image-side surface S12 thereof is convex. The seventh lens E7 has a negative refractive power, an object-side surface S13 thereof is concave, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=6.48 mm, a distance TTL along the optical axis from the object-side surface S1 of the first lens E1 to the imaging plane S17 satisfies TTL=8.00 mm, half of a diagonal length ImgH of an effective pixel area on the imaging plane S17 satisfies ImgH=2.83 mm, and half of a maximum field-of-view Semi-FOV of the optical imaging lens assembly satisfies Semi-FOV=23.0°.

Table 13 is a table illustrating basic parameters of the optical imaging lens assembly of example 7, wherein the units of the radius of curvature, the thickness/distance and the focal length are millimeter (mm).

TABLE 13

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 3.3780 | 1.1247 | 1.55 | 56.1 | 9.43 | −0.7947 |
| S2 | Aspheric | 8.6600 | 0.4869 | | | | −84.4673 |
| STO | Spherical | Infinite | −0.1673 | | | | |
| S3 | Aspheric | −230.0000 | 0.4500 | 1.67 | 20.4 | −14.11 | 69.9784 |
| S4 | Aspheric | 9.8129 | 0.2168 | | | | 2.9032 |
| S5 | Aspheric | 3.8224 | 0.7528 | 1.55 | 56.1 | 8.77 | −12.1274 |
| S6 | Aspheric | 17.6102 | 0.0250 | | | | 52.5975 |
| S7 | Aspheric | 6.0405 | 0.8348 | 1.55 | 56.1 | 11.28 | 3.7906 |
| S8 | Aspheric | 300.0000 | 0.0250 | | | | 99.0000 |
| S9 | Aspheric | 2.8621 | 0.3800 | 1.67 | 20.4 | −9.43 | −3.5544 |
| S10 | Aspheric | 1.8622 | 1.0290 | | | | 0.1515 |
| S11 | Aspheric | 28.4123 | 0.6682 | 1.67 | 20.4 | 17.17 | 98.8992 |
| S12 | Aspheric | −18.9750 | 0.5558 | | | | 99.0000 |
| S13 | Aspheric | −13.9821 | 0.7500 | 1.55 | 56.1 | −6.29 | 44.7848 |
| S14 | Aspheric | 4.6356 | 0.1346 | | | | −28.0879 |
| S15 | Spherical | Infinite | 0.2100 | 1.52 | 64.2 | | |
| S16 | Spherical | Infinite | 0.5237 | | | | |
| S17 | Spherical | Infinite | | | | | |

In example 7, the object-side surface and the image-side surface of any one of the first lens E1 to the seventh lens E7 are aspheric. Table 14 below shows high-order coefficients A4, A6, A8, A10, A12, A14, A16, A18 and A20 applicable to each aspheric surface S1 to S14 in example 7.

TABLE 14

| Surface number | A4 | A6 | A8 | A10 | A12 | A14 | A16 | A18 | A20 |
|---|---|---|---|---|---|---|---|---|---|
| S1 | −1.5161E−04 | −6.1585E−04 | −1.5863E−04 | 8.8794E−05 | −3.3591E−05 | 4.9239E−06 | −1.6033E−07 | −1.8115E−08 | 1.1168E−09 |
| S2 | 1.7475E−02 | −1.7279E−02 | 7.9789E−03 | −2.5573E−03 | 5.6738E−04 | −8.4759E−05 | 8.1220E−06 | −4.4764E−07 | 1.0690E−08 |
| S3 | 2.3689E−02 | −2.3792E−02 | 1.5462E−02 | −5.9235E−03 | 1.4830E−03 | −2.4426E−04 | 2.5304E−05 | −1.4837E−06 | 3.6896E−08 |
| S4 | 1.6965E−02 | −2.2684E−02 | 1.7458E−02 | −7.0904E−03 | 1.8072E−03 | −2.8720E−04 | 2.5923E−05 | −1.0639E−06 | 5.4111E−09 |
| S5 | 7.8426E−03 | −1.3181E−02 | 4.9265E−03 | −4.0455E−04 | −1.1551E−04 | 1.6328E−05 | 5.9248E−06 | −1.6888E−06 | 1.1895E−07 |
| S6 | −9.9631E−03 | −1.8572E−02 | 1.8549E−02 | −7.9599E−03 | 1.7309E−03 | −1.2876E−04 | −1.9618E−05 | 4.4139E−06 | −2.3881E−07 |
| S7 | 1.5302E−02 | −2.9199E−02 | 2.6630E−02 | −1.2512E−02 | 3.1740E−03 | −4.1590E−04 | 2.2090E−05 | 0.0000E+00 | 0.0000E+00 |
| S8 | 1.4361E−03 | −5.8461E−03 | 2.2874E−03 | −1.1244E−03 | 4.4934E−04 | −8.6325E−05 | 6.0743E−06 | 0.0000E+00 | 0.0000E+00 |
| S9 | −2.9541E−02 | 1.8515E−02 | −5.4850E−03 | −4.4521E−04 | 1.0929E−03 | −3.3067E−04 | 3.0944E−05 | 0.0000E+00 | 0.0000E+00 |
| S10 | −5.9656E−02 | 2.4651E−02 | −9.9853E−03 | 2.2315E−03 | −4.9295E−04 | 2.5592E−04 | −7.7221E−05 | 0.0000E+00 | 0.0000E+00 |
| S11 | −2.2453E−02 | −2.9472E−04 | −2.0391E−03 | 6.4186E−04 | −2.2165E−04 | 2.6048E−05 | 0.0000E+00 | 0.0000E+00 | 0.0000E+00 |
| S12 | −2.5448E−02 | 5.5703E−03 | −5.1797E−03 | 3.3985E−03 | −1.8450E−03 | 6.2842E−04 | −1.1680E−04 | 9.5625E−06 | 0.0000E+00 |
| S13 | −8.1121E−02 | 2.4368E−02 | −9.0970E−03 | 4.4609E−03 | −1.8044E−03 | 3.9525E−04 | −3.1655E−05 | 0.0000E+00 | 0.0000E+00 |
| S14 | −3.7866E−02 | 5.7661E−03 | −3.5340E−04 | −2.4754E−04 | 7.2978E−05 | −8.7912E−06 | 4.3216E−07 | 0.0000E+00 | 0.0000E+00 |

Figures 14A, 14B:
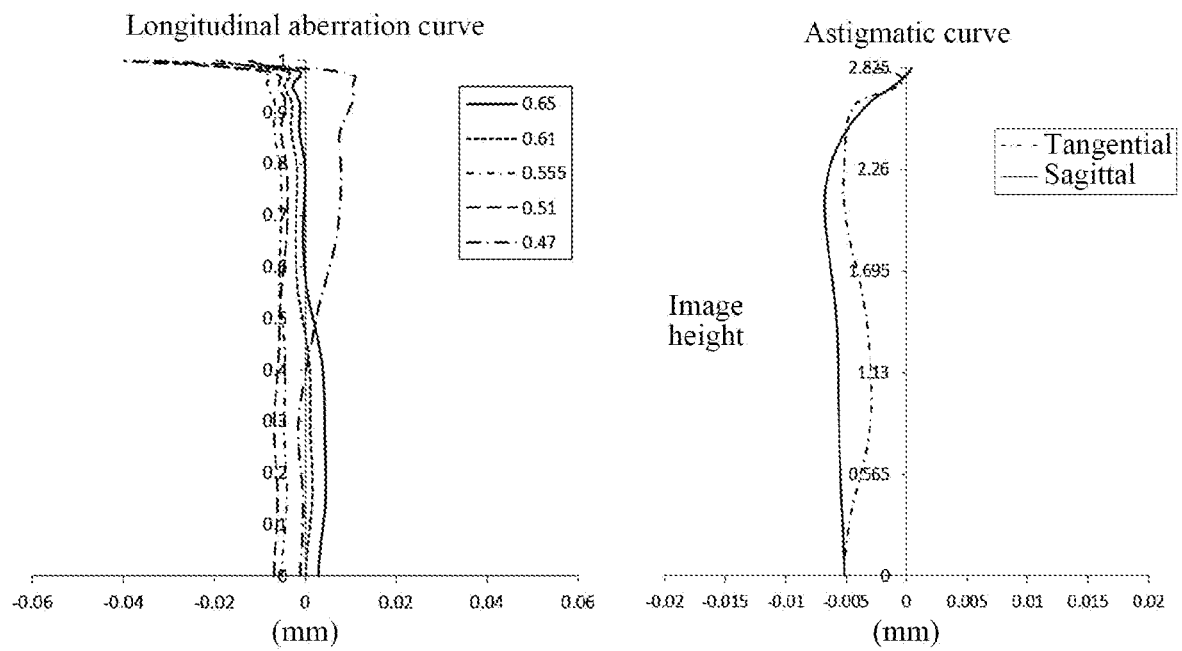
FIGS. 14A to 14D illustrate longitudinal aberration curves, astigmatic curves, a distortion curve, and a lateral color curve of the optical imaging lens assembly of the example 7, respectively.
Figures 14C, 14D:
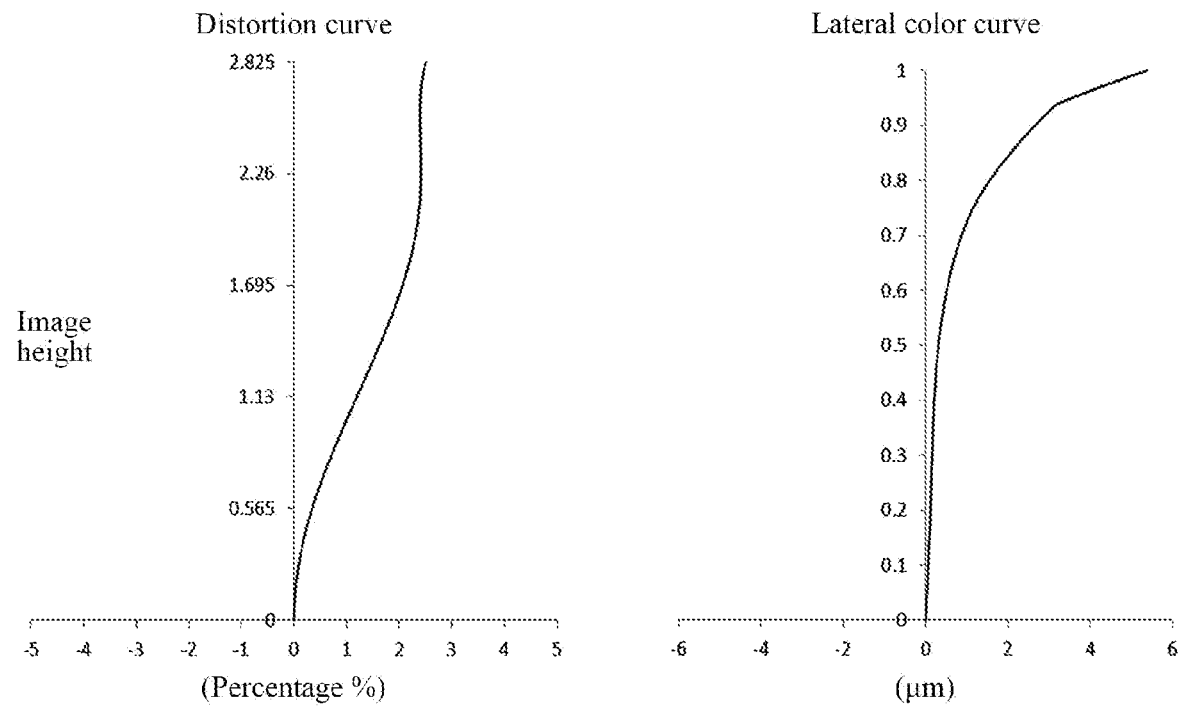

FIG. 14A illustrates longitudinal aberration curves of the optical imaging lens assembly according to example 7, representing the deviations of focal points converged by light of different wavelengths which passes through the lens assembly. FIG. 14B illustrates astigmatic curves of the optical imaging lens assembly according to example 7, representing the curvatures of a tangential plane and the curvatures of a sagittal plane. FIG. 14C illustrates a distortion curve of the optical imaging lens assembly according to example 7, representing the amounts of distortion corresponding to different image heights. FIG. 14D illustrates a lateral color curve of the optical imaging lens assembly according to example 7, representing the deviations of different image heights on an imaging plane formed by light passing through the lens assembly. It can be seen from FIG. 14A to FIG. 14D that the optical imaging lens assembly provided in example 7 may achieve good image quality.

Example 8

Figure 15:
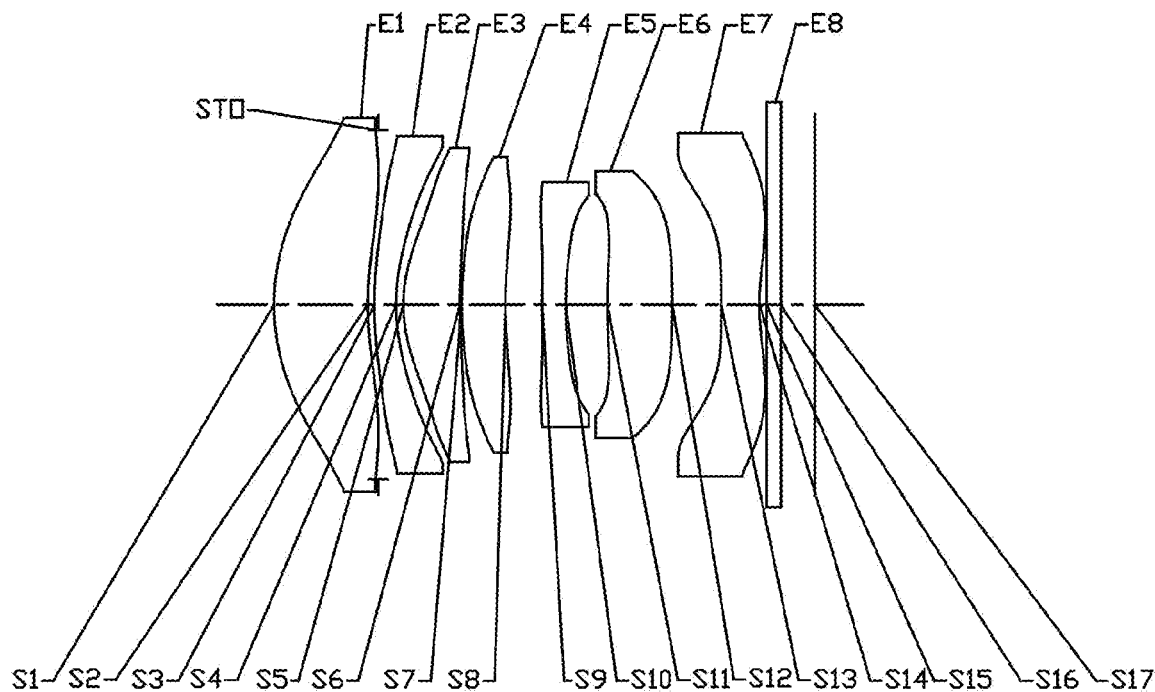
FIG. 15 illustrates a schematic structural diagram of an optical imaging lens assembly according to example 8 of the present disclosure.

An optical imaging lens assembly according to example 8 of the present disclosure is described below with reference to FIG. 15 to FIG. 16D. FIG. 15 shows a schematic structural diagram of the optical imaging lens assembly according to example 8 of the present disclosure.

As shown in FIG. 15, the optical imaging lens assembly includes a first lens E1, a stop STO, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has a positive refractive power, an object-side surface S1 thereof is convex, and an image-side surface S2 thereof is concave. The second lens E2 has a negative refractive power, an object-side surface S3 thereof is convex, and an image-side surface S4 thereof is concave. The third lens E3 has a positive refractive power, an object-side surface S5 thereof is convex, and an image-side surface S6 thereof is concave. The fourth lens E4 has a positive refractive power, an object-side surface S7 thereof is convex, and an image-side surface S8 thereof is concave. The fifth lens E5 has a negative refractive power, an object-side surface S9 thereof is convex, and an image-side surface S10 thereof is concave. The sixth lens E6 has a positive refractive power, an object-side surface S11 thereof is convex, and an image-side surface S12 thereof is convex. The seventh lens E7 has a negative refractive power, an object-side surface S13 thereof is convex, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=6.63 mm, a distance TTL along the optical axis from the object-side surface S1 of the first lens E1 to the imaging plane S17 satisfies TTL=8.00 mm, half of a diagonal length ImgH of an effective pixel area on the imaging plane S17 satisfies ImgH=2.83 mm, and half of a maximum field-of-view Semi-FOV of the optical imaging lens assembly satisfies Semi-FOV=22.6°.

Table 15 is a table illustrating basic parameters of the optical imaging lens assembly of example 8, wherein the units of the radius of curvature, the thickness/distance and the focal length are millimeter (mm).

TABLE 15

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 3.2220 | 1.3851 | 1.55 | 56.1 | 13.45 | −0.4377 |
| S2 | Aspheric | 4.8700 | 0.1551 | | | −43.5671 | |
| STO | Spherical | Infinite | −0.0551 | | | | |
| S3 | Aspheric | 6.1800 | 0.3200 | 1.64 | 23.5 | −9.15 | −84.8456 |
| S4 | Aspheric | 2.9570 | 0.1064 | | | | −11.9696 |
| S5 | Aspheric | 2.1360 | 0.8395 | 1.55 | 56.1 | 4.60 | −5.9456 |
| S6 | Aspheric | 12.3204 | 0.0250 | | | | 26.6596 |
| S7 | Aspheric | 6.2716 | 0.6487 | 1.55 | 56.1 | 52.58 | 4.1566 |
| S8 | Aspheric | 7.7320 | 0.5403 | | | | −96.7599 |
| S9 | Aspheric | 25.7839 | 0.3500 | 1.67 | 20.4 | −9.87 | −94.2423 |
| S10 | Aspheric | 5.2132 | 0.6168 | | | | 7.7866 |
| S11 | Aspheric | 9.8709 | 0.9600 | 1.64 | 23.5 | 9.98 | −49.3195 |
| S12 | Aspheric | −17.7837 | 0.7232 | | | | −8.3109 |
| S13 | Aspheric | 200.0000 | 0.5625 | 1.55 | 56.1 | −6.24 | 99.0000 |
| S14 | Aspheric | 3.3437 | 0.1085 | | | | −16.5448 |
| S15 | Spherical | Infinite | 0.2100 | 1.52 | 64.2 | | |
| S16 | Spherical | Infinite | 0.5039 | | | | |
| S17 | Spherical | Infinite | | | | | |

In example 8, the object-side surface and the image-side surface of any one of the first lens E1 to the seventh lens E7 are aspheric. Table 16 below shows high-order coefficients A4, A6, A8, A10, A12, A14, A16, A18 and A20 applicable to each aspheric surface S1 to S14 in example 8.

TABLE 16

| Surface number | A4 | A6 | A8 | A10 | A12 | A14 | A16 | A18 | A20 |
|---|---|---|---|---|---|---|---|---|---|
| S1 | −7.3211E−04 | −1.3352E−04 | −1.0398E−04 | 4.9259E−05 | −2.1975E−05 | 5.4622E−06 | −8.6106E−07 | 7.7171E−08 | −2.8185E−09 |
| S2 | 3.4878E−02 | −4.1911E−02 | 2.3228E−02 | −8.3607E−03 | 2.0389E−03 | −3.3275E−04 | 3.4654E−05 | −2.0731E−06 | 5.4058E−08 |
| S3 | 4.1845E−02 | −4.9434E−02 | 3.2823E−02 | −1.3737E−02 | 3.7775E−03 | −6.7717E−04 | 7.5958E−05 | −4.8311E−06 | 1.3246E−07 |
| S4 | 3.0535E−02 | −3.4461E−02 | 2.7145E−02 | −1.2514E−02 | 3.3538E−03 | −4.9014E−04 | 3.0089E−05 | 5.7797E−07 | −1.1546E−07 |
| S5 | 3.1050E−02 | −3.0229E−02 | 1.5679E−02 | −5.4624E−03 | 7.1408E−04 | 2.2493E−04 | −1.0129E−04 | 1.4539E−05 | −7.4707E−07 |
| S6 | 2.9715E−02 | −8.6667E−02 | 8.2624E−02 | −4.5475E−02 | 1.5972E−02 | −3.5870E−03 | 4.8963E−04 | −3.6172E−05 | 1.0697E−06 |
| S7 | 3.0353E−02 | −8.2424E−02 | 8.3310E−02 | −4.6038E−02 | 1.5916E−02 | −3.5051E−03 | 4.6048E−04 | −3.0598E−05 | 6.5216E−07 |
| S8 | 1.4942E−02 | −1.9621E−02 | 1.2160E−02 | −6.6729E−03 | 2.5941E−03 | −6.1051E−04 | 7.3798E−05 | −2.4293E−06 | −1.7925E−07 |
| S9 | −4.1699E−02 | 2.2437E−02 | −5.4222E−03 | −7.5188E−04 | 2.4718E−03 | −1.6473E−03 | 5.4456E−04 | −9.1999E−05 | 6.3343E−06 |
| S10 | −4.4699E−02 | 2.7559E−02 | −7.6941E−03 | 2.4710E−03 | −7.5753E−04 | 4.4087E−04 | −2.7866E−04 | 8.4238E−05 | −1.0144E−05 |
| S11 | −2.2371E−02 | 1.9316E−03 | −1.2685E−02 | 1.9415E−02 | −1.9199E−02 | 1.1806E−02 | −4.4441E−03 | 9.3340E−04 | −8.4868E−05 |
| S12 | −2.3732E−02 | −1.5438E−03 | 2.7626E−03 | −5.1478E−03 | 4.2603E−03 | −2.0098E−03 | 5.5576E−04 | −8.4252E−05 | 5.4204E−06 |
| S13 | −9.6504E−02 | 2.8685E−02 | −8.0040E−03 | 1.5277E−03 | 1.2981E−04 | −1.4715E−04 | 3.6699E−05 | −4.3093E−06 | 1.9988E−07 |
| S14 | −4.1784E−02 | 6.8742E−03 | 9.1348E−04 | −1.5586E−03 | 6.8939E−04 | −1.6706E−04 | 2.3710E−05 | −1.8565E−06 | 6.2507E−08 |

Figure 16A:
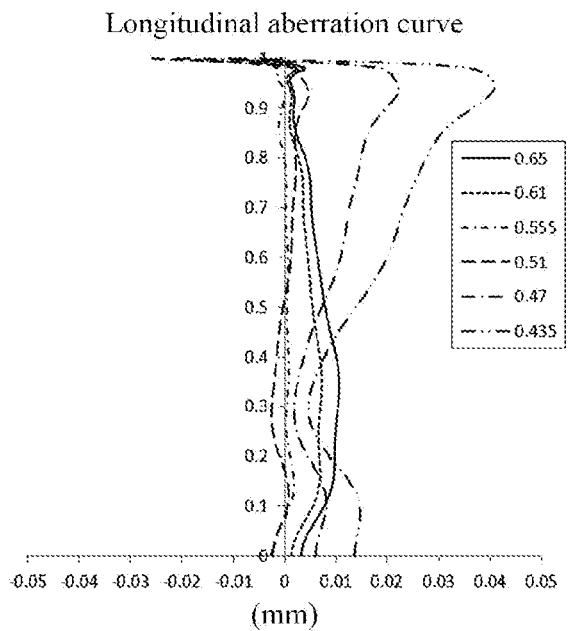
FIGS. 16A to 16D illustrate longitudinal aberration curves, astigmatic curves, a distortion curve, and a lateral color curve of the optical imaging lens assembly of the example 8, respectively.
Figure 16B:
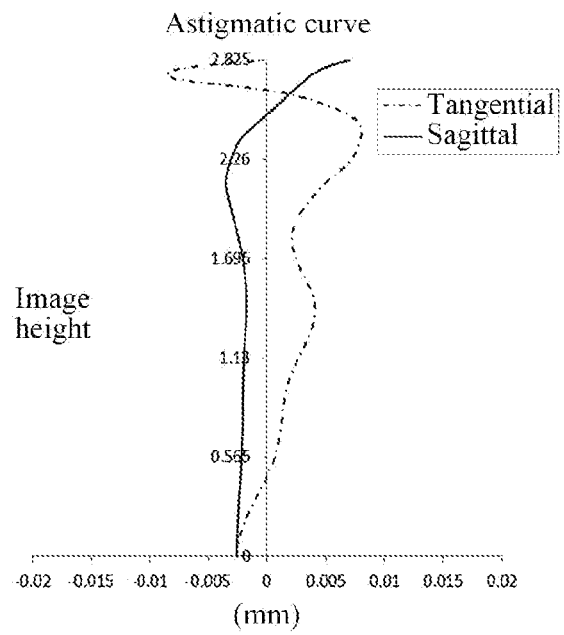
Figure 16C:
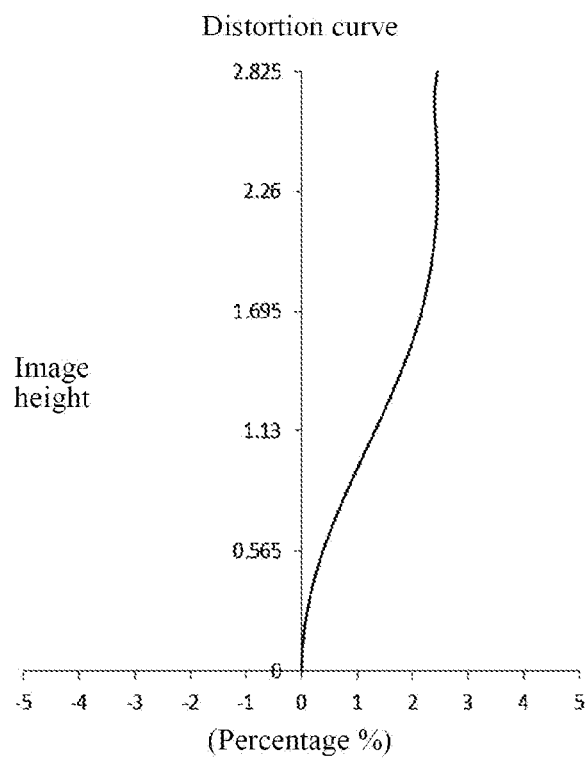
Figure 16D:
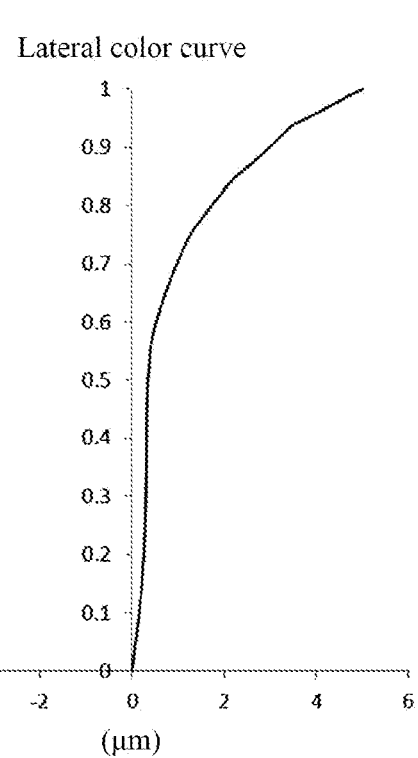

FIG. 16A illustrates longitudinal aberration curves of the optical imaging lens assembly according to example 8, representing the deviations of focal points converged by light of different wavelengths which passes through the lens assembly. FIG. 16B illustrates astigmatic curves of the optical imaging lens assembly according to example 8, representing the curvatures of a tangential plane and the curvatures of a sagittal plane. FIG. 16C illustrates a distortion curve of the optical imaging lens assembly according to example 8, representing the amounts of distortion corresponding to different image heights. FIG. 16D illustrates a lateral color curve of the optical imaging lens assembly according to example 8, representing the deviations of different image heights on an imaging plane formed by light passing through the lens assembly. It can be seen from FIG. 16A to FIG. 16D that the optical imaging lens assembly provided in example 8 may achieve good image quality.

Example 9

An optical imaging lens assembly according to example 9 of the present disclosure is described below with reference to FIG. 17 to FIG. 18D. FIG. 17 shows a schematic structural diagram of the optical imaging lens assembly according to example 9 of the present disclosure.

As shown in FIG. 17, the optical imaging lens assembly includes a first lens E1, a stop STO, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has a positive refractive power, an object-side surface S1 thereof is convex, and an image-side surface S2 thereof is concave. The second lens E2 has a negative refractive power, an object-side surface S3 thereof is convex, and an image-side surface S4 thereof is concave. The third lens E3 has a positive refractive power, an object-side surface S5 thereof is convex, and an image-side surface S6 thereof is concave. The fourth lens E4 has a positive refractive power, an object-side surface S7 thereof is convex, and an image-side surface S8 thereof is concave. The fifth lens E5 has a negative refractive power, an object-side surface S9 thereof is convex, and an image-side surface S10 thereof is concave. The sixth lens E6 has a negative refractive power, an object-side surface S11 thereof is convex, and an image-side surface S12 thereof is concave. The seventh lens E7 has a negative refractive power, an object-side surface S13 thereof is convex, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=6.56 mm, a distance TTL along the optical axis from the object-side surface S1 of the first lens E1 to the imaging plane S17 satisfies TTL=8.00 mm, half of a diagonal length ImgH of an effective pixel area on the imaging plane S17 satisfies ImgH=2.83 mm, and half of a maximum field-of-view Semi-FOV of the optical imaging lens assembly satisfies Semi-FOV=22.8°.

Table 17 is a table illustrating basic parameters of the optical imaging lens assembly of example 9, wherein the units of the radius of curvature, the thickness/distance and the focal length are millimeter (mm).

TABLE 17

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| S1 | Aspheric | 3.3750 | 1.2918 | 1.55 | 56.1 | 8.48 | −0.5289 |
| S2 | Aspheric | 10.7829 | 0.3862 | | | | −44.8660 |
| STO | Spherical | Infinite | −0.2862 | | | | |
| S3 | Aspheric | 27.1026 | 0.3200 | 1.67 | 20.4 | −15.09 | 80.5940 |
| S4 | Aspheric | 7.3008 | 0.2343 | | | | −2.9929 |
| S5 | Aspheric | 3.7109 | 1.0628 | 1.55 | 56.1 | 8.37 | −4.8790 |
| S6 | Aspheric | 17.7510 | 0.0250 | | | | 51.5823 |
| S7 | Aspheric | 7.4975 | 0.5547 | 1.55 | 56.1 | 18.48 | 0.5392 |
| S8 | Aspheric | 28.4169 | 0.0250 | | | | 86.6380 |

TABLE 17-continued

| Surface number | Surface type | Radius of curvature | Thickness/ Distance | Material Refractive index | Abbe number | Focal length | Conic coefficient |
|---|---|---|---|---|---|---|---|
| S9  | Aspheric  | 3.2290   | 0.3549 | 1.67 | 20.4 | −11.04 | −2.8662 |
| S10 | Aspheric  | 2.1453   | 1.0231 |      |      |        | 0.4771  |
| S11 | Aspheric  | 25.8807  | 0.9600 | 1.67 | 20.4 | −80.06 | 98.9277 |
| S12 | Aspheric  | 17.1685  | 0.3135 |      |      |        | −98.9368 |
| S13 | Aspheric  | 6.9318   | 0.7500 | 1.55 | 56.1 | −12.76 | −99.0000 |
| S14 | Aspheric  | 3.3420   | 0.1931 |      |      |        | −15.5928 |
| S15 | Spherical | Infinite | 0.2100 | 1.52 | 64.2 |        |         |
| S16 | Spherical | Infinite | 0.5819 |      |      |        |         |
| S17 | Spherical | Infinite |        |      |      |        |         |

In example 9, the object-side surface and the image-side surface of any one of the first lens E1 to the seventh lens E7 are aspheric. Table 18 below shows high-order coefficients A4, A6, A8, A10, A12, A14, A16, A18 and A20 applicable to each aspheric surface S1 to S14 in example 9.

TABLE 18

| Surface number | A4 | A6 | A8 | A10 | A12 | A14 | A16 | A18 | A20 |
|---|---|---|---|---|---|---|---|---|---|
| S1  | −7.5362E−04 | −6.1232E−04 |  3.1965E−04 | −2.2190E−04 |  7.6587E−05 | −1.7029E−05 |  2.2931E−06 | −1.6309E−07 |  4.6966E−09 |
| S2  |  1.4558E−02 | −1.4365E−02 |  4.8663E−03 | −4.8548E−04 | −2.0605E−04 |  8.4578E−05 | −1.3590E−05 |  1.0663E−06 | −3.3691E−08 |
| S3  |  3.1435E−02 | −2.5550E−02 |  1.0871E−02 | −2.0059E−03 | −5.1785E−05 |  9.7582E−05 | −1.9059E−05 |  1.6488E−06 | −5.6465E−08 |
| S4  |  2.6209E−02 | −2.0345E−02 |  8.0257E−03 | −5.5179E−04 | −5.7170E−04 |  2.1885E−04 | −3.6397E−05 |  2.9734E−06 | −9.6460E−08 |
| S5  |  1.0737E−02 | −6.2363E−03 | −1.4798E−03 |  2.5579E−03 | −1.0554E−03 |  2.2868E−04 | −2.7259E−05 |  1.5222E−06 | −2.1183E−08 |
| S6  |  2.2953E−02 | −6.4776E−02 |  5.4868E−02 | −2.5860E−02 |  7.5287E−03 | −1.3908E−03 |  1.5880E−04 | −1.0239E−05 |  2.8658E−07 |
| S7  |  3.8658E−02 | −7.2498E−02 |  5.7160E−02 | −2.4136E−02 |  5.6339E−03 | −6.8785E−04 |  3.4566E−05 |  0.0000E+00 |  0.0000E+00 |
| S8  |  3.7516E−03 | −1.6001E−02 |  1.1471E−02 | −5.5077E−03 |  1.5838E−03 | −2.3607E−04 |  1.4113E−05 |  0.0000E+00 |  0.0000E+00 |
| S9  | −2.5984E−02 |  8.9984E−03 |  4.6001E−03 | −6.1704E−03 |  2.9453E−03 | −6.4226E−04 |  5.1818E−05 |  0.0000E+00 |  0.0000E+00 |
| S10 | −4.7253E−02 |  1.8228E−02 | −4.9545E−03 | −3.4853E−04 |  5.6343E−04 | −3.0853E−05 | −3.3103E−05 |  0.0000E+00 |  0.0000E+00 |
| S11 | −2.2123E−02 | −2.6319E−03 |  2.5821E−03 | −3.6800E−03 |  1.6330E−03 | −2.7950E−04 |  0.0000E+00 |  0.0000E+00 |  0.0000E+00 |
| S12 | −5.1705E−02 |  2.9405E−02 | −2.1068E−02 |  1.0495E−02 | −3.6881E−03 |  8.2231E−04 | −1.0028E−04 |  5.2462E−06 |  0.0000E+00 |
| S13 | −9.2880E−02 |  2.4163E−02 | −8.8351E−03 |  4.4007E−03 | −1.8044E−03 |  3.9525E−04 | −3.1655E−05 |  0.0000E+00 |  0.0000E+00 |
| S14 | −4.1726E−02 |  5.8539E−03 | −3.9123E−04 | −2.1375E−04 |  7.0301E−05 | −8.9324E−06 |  4.3214E−07 |  0.0000E+00 |  0.0000E+00 |

Figure 18C:
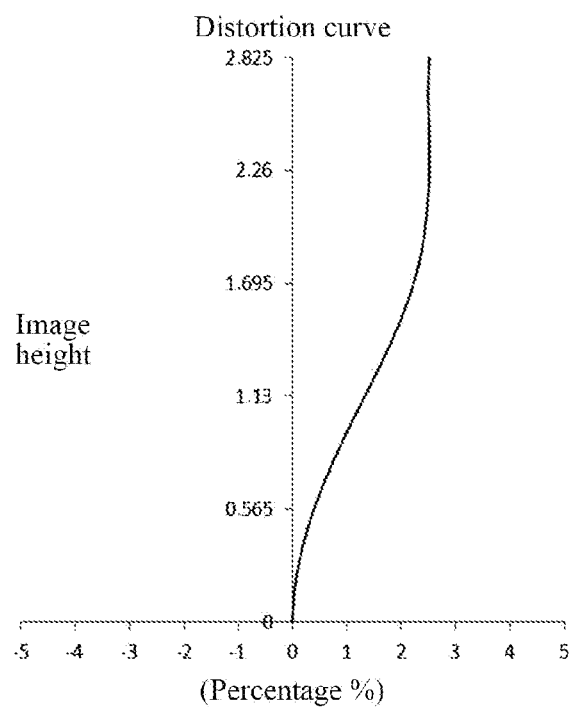
Figure 18D:
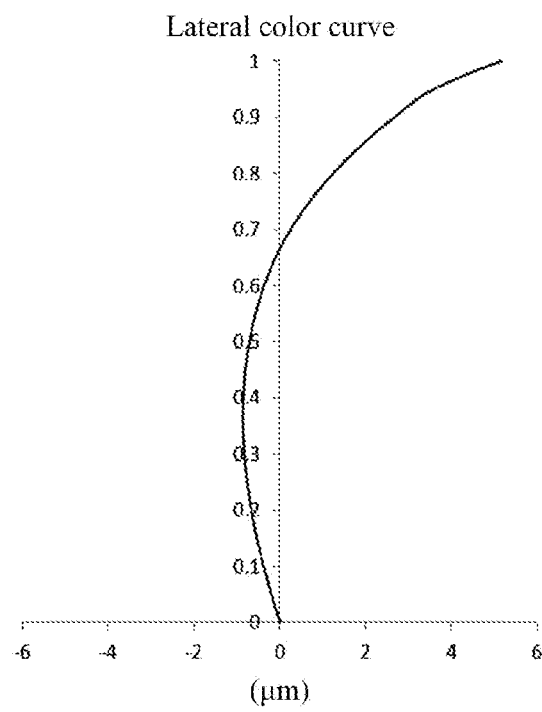

FIG. 18A illustrates longitudinal aberration curves of the optical imaging lens assembly according to example 9, representing the deviations of focal points converged by light of different wavelengths which passes through the lens assembly. FIG. 18B illustrates astigmatic curves of the optical imaging lens assembly according to example 9, representing the curvatures of a tangential plane and the curvatures of a sagittal plane. FIG. 18C illustrates a distortion curve of the optical imaging lens assembly according to example 9, representing the amounts of distortion corresponding to different image heights. FIG. 18D illustrates a lateral color curve of the optical imaging lens assembly according to example 9, representing the deviations of different image heights on an imaging plane formed by light passing through the lens assembly. It can be seen from FIG. 18A to FIG. 18D that the optical imaging lens assembly provided in example 9 may achieve good image quality.

In view of the above, examples 1 to 9 respectively satisfy the relationship shown in Table 19.

TABLE 19

| Conditional/Example | 1 | 2 | 3 | 4 | 5 | 6 | 7 | 8 | 9 |
|---|---|---|---|---|---|---|---|---|---|
| ImgH/EPD | 0.53 | 0.52 | 0.53 | 0.52 | 0.53 | 0.53 | 0.54 | 0.53 | 0.53 |
| f3/f | 0.69 | 1.28 | 1.28 | 1.23 | 1.09 | 1.31 | 1.35 | 0.69 | 1.28 |
| SAG11/CT1 | 0.74 | 0.70 | 0.67 | 0.69 | 0.70 | 0.69 | 0.69 | 0.75 | 0.76 |
| f1234/f | 0.85 | 0.73 | 0.72 | 0.74 | 0.72 | 0.71 | 0.75 | 0.84 | 0.76 |
| R1/R5 | 1.50 | 0.91 | 0.89 | 0.92 | 0.83 | 0.79 | 0.88 | 1.51 | 0.91 |
| SAG52/SAG61 | −1.71 | −2.71 | −2.24 | −2.23 | −2.40 | −3.41 | −3.59 | −1.94 | −3.51 |
| R10/f5 | −0.62 | −0.27 | −0.25 | −0.23 | −0.25 | −0.25 | −0.20 | −0.53 | −0.19 |
| (T12 + T23 + T34)/ (T56 + T67) | 0.21 | 0.18 | 0.17 | 0.16 | 0.20 | 0.29 | 0.35 | 0.17 | 0.27 |
| BFL/TD | 0.11 | 0.13 | 0.13 | 0.13 | 0.13 | 0.13 | 0.12 | 0.11 | 0.14 |
| SL/TTL | 0.81 | 0.80 | 0.79 | 0.78 | 0.80 | 0.80 | 0.80 | 0.81 | 0.79 |
| DT12/ImgH | 0.92 | 0.95 | 0.97 | 0.98 | 0.96 | 0.95 | 0.98 | 0.92 | 0.94 |
| DT41/DT52 | 1.31 | 1.49 | 1.50 | 1.50 | 1.46 | 1.47 | 1.45 | 1.35 | 1.43 |
| SAG22/SAG31 | 0.89 | 1.09 | 1.14 | 1.09 | 1.22 | 1.24 | 1.31 | 0.98 | 0.96 |
| DT21/DT62 | 1.27 | 1.38 | 1.41 | 1.42 | 1.40 | 1.37 | 1.34 | 1.26 | 1.27 |
| f/EPD | 1.23 | 1.22 | 1.23 | 1.23 | 1.23 | 1.23 | 1.23 | 1.24 | 1.23 |
| tan(Semi-FOV) | 0.42 | 0.42 | 0.42 | 0.41 | 0.42 | 0.42 | 0.42 | 0.42 | 0.42 |

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, sequentially from an object side to an image side along an optical axis, comprising:
   a first lens having a positive refractive power;
   a second lens having a refractive power;
   a third lens having a positive refractive power, an object-side surface of the third lens being convex;
   a fourth lens having a refractive power;
   a fifth lens having a refractive power, an image-side surface of the fifth lens being concave;
   a sixth lens having a refractive power; and
   a seventh lens having a refractive power,
   wherein half of a diagonal length ImgH of an effective pixel area on an imaging plane of the optical imaging lens assembly and an entrance pupil diameter EPD of the optical imaging lens assembly satisfy: ImgH/EPD<0.7,
   wherein the sequentially arranged first lens to the fifth lens are lenses arranged in a descending order of maximum effective radii, and a maximum effective radius D41 of an object-side surface of the fourth lens and a maximum effective radius D52 of the image-side surface of the fifth lens satisfy: 1.2<DT41/DT52<1.6.

2. The optical imaging lens assembly according to claim 1, wherein a maximum effective radius DT12 of an image-side surface of the first lens and the half of the diagonal length ImgH of the effective pixel area on the imaging plane of the optical imaging lens assembly satisfy:

$0.8<DT12/ImgH<1$.

3. The optical imaging lens assembly according to claim 1, wherein an effective focal length f3 of the third lens and a total effective focal length f of the optical imaging lens assembly satisfy:

$0.5<f3/f<1.5$.

4. The optical imaging lens assembly according to claim 1, wherein an axial distance SAG11 from an intersection of an object-side surface of the first lens and the optical axis to a vertex of an effective radius of the object-side surface of the first lens and a center thickness CT1 of the first lens along the optical axis satisfy:

$0.5<SAG11/CT1<1$.

5. The optical imaging lens assembly according to claim 1, wherein a combined focal length f1234 of the first lens, the second lens, the third lens and the fourth lens and a total effective focal length f of the optical imaging lens assembly satisfy:

$0.5<f1234/f<1$.

6. The optical imaging lens assembly according to claim 1, wherein a radius of curvature R1 of an object-side surface of the first lens and a radius of curvature R5 of the object-side surface of the third lens satisfy:

$0.8<R1/R5<1.6$.

7. The optical imaging lens assembly according to claim 1, wherein an axial distance SAG52 from an intersection of the image-side surface of the fifth lens and the optical axis to a vertex of an effective radius of the image-side surface of the fifth lens and an axial distance SAG61 from an intersection of an object-side surface of the sixth lens and the optical axis to a vertex of an effective radius of the object-side surface of the sixth lens satisfy:

$-4<SAG52/SAG61<0$.

8. The optical imaging lens assembly according to claim 1, wherein a radius of curvature R10 of the image-side surface of the fifth lens and an effective focal length f5 of the fifth lens satisfy:

$-0.7<R10/f5<0$.

9. The optical imaging lens assembly according to claim 1, wherein a spaced interval T12 between the first lens and the second lens along the optical axis, a spaced interval T23 between the second lens and the third lens along the optical axis, a spaced interval T34 between the third lens and the fourth lens along the optical axis, a spaced interval T56 between the fifth lens and the sixth lens along the optical axis and a spaced interval T67 between the sixth lens and the seventh lens along the optical axis satisfy:

$(T12+T23+T34)/(T56+T67)<0.4$.

10. The optical imaging lens assembly according to claim 1, wherein a distance BFL along the optical axis from an image-side surface of the seventh lens to the imaging plane of the optical imaging lens assembly and an interval TD along the optical axis from an object-side surface of the first lens to the image-side surface of the seventh lens satisfy:

$BFL/TD<0.2$.

11. The optical imaging lens assembly according to claim 1, further comprising a stop disposed between the first lens and the second lens, wherein an interval SL along the optical axis from the stop to the imaging plane of the optical imaging lens assembly and a distance TTL along the optical axis from an object-side surface of the first lens to the imaging plane of the optical imaging lens assembly satisfy:

$0.7<SL/TTL<0.9$.

12. The optical imaging lens assembly according to claim 1, wherein an axial distance SAG22 from an intersection of an image-side surface of the second lens and the optical axis to a vertex of an effective radius of the image-side surface of the second lens and an axial distance SAG31 from an intersection of the object-side surface of the third lens and the optical axis to a vertex of an effective radius of the object-side surface of the third lens satisfy:

$0.8<SAG22/SAG31<1.4$.

13. The optical imaging lens assembly according to claim 1, wherein a maximum effective radius DT21 of an object-side surface of the second lens and a maximum effective radius DT62 of an image-side surface of the sixth lens satisfy:

$1<DT21/DT62<1.5$.

14. An optical imaging lens assembly, sequentially from an object side to an image side along an optical axis, comprising:
- a first lens having a positive refractive power;
- a second lens having a refractive power;
- a third lens having a positive refractive power, an object-side surface of the third lens being convex;
- a fourth lens having a refractive power;
- a fifth lens having a refractive power, an image-side surface of the fifth lens being concave;
- a sixth lens having a refractive power; and
- a seventh lens having a refractive power,
- wherein a total effective focal length f of the optical imaging lens assembly and an entrance pupil diameter EPD of the optical imaging lens assembly satisfy: f/EPD<1.5, and
- half of a maximum field-of-view Semi-FOV of the optical imaging lens assembly satisfies:

tan(Semi-FOV)<0.55;

wherein the sequentially arranged first lens to the fifth lens are lenses arranged in a descending order of maximum effective radii, and a maximum effective radius D41 of an object-side surface of the fourth lens and a maximum effective radius D52 of the image-side surface of the fifth lens satisfy: 1.2<DT41/DT52<1.6.

15. The optical imaging lens assembly according to claim 14, wherein half of a diagonal length ImgH of an effective pixel area on an imaging plane of the optical imaging lens assembly and the entrance pupil diameter EPD of the optical imaging lens assembly satisfy:

Img$H$/EPD<0.7.

16. The optical imaging lens assembly according to claim 14, wherein a maximum effective radius DT12 of an image-side surface of the first lens and half of a diagonal length ImgH of an effective pixel area on an imaging plane of the optical imaging lens assembly satisfy:

0.8<$DT$12/Img$H$<1.

17. The optical imaging lens assembly according to claim 14, wherein a radius of curvature R10 of the image-side surface of the fifth lens and an effective focal length f5 of the fifth lens satisfy:

−0.7<$R$10/$f$5<0.

* * * * *